(12) United States Patent
Jeong

(10) Patent No.: US 11,627,253 B2
(45) Date of Patent: Apr. 11, 2023

(54) CAMERA ACTUATOR AND A CAMERA MODULE INCLUDING THE SAME

(71) Applicant: LG INNOTEK CO., LTD., Seoul (KR)

(72) Inventor: Soo Min Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/282,259

(22) PCT Filed: Oct. 4, 2019

(86) PCT No.: PCT/KR2019/013036
§ 371 (c)(1),
(2) Date: Apr. 1, 2021

(87) PCT Pub. No.: WO2020/071852
PCT Pub. Date: Apr. 9, 2020

(65) Prior Publication Data
US 2021/0377447 A1    Dec. 2, 2021

(30) Foreign Application Priority Data

Oct. 5, 2018    (KR) .................. 10-2018-0119237

(51) Int. Cl.
*H04N 5/232* (2006.01)
*G03B 5/02* (2021.01)
*H04N 5/225* (2006.01)

(52) U.S. Cl.
CPC .......... *H04N 5/23283* (2013.01); *G03B 5/02* (2013.01); *H04N 5/2253* (2013.01); *H04N 5/2254* (2013.01); *G03B 2205/0069* (2013.01)

(58) Field of Classification Search
CPC ............ H04N 5/23283; H04N 5/2253; H04N 5/2254; H04N 5/2257; H04N 5/2328;
(Continued)

(56) References Cited

U.S. PATENT DOCUMENTS 10,516,773 B2    12/2019    Yoon et al.
2014/0071304 A1    3/2014    Kim
(Continued)

FOREIGN PATENT DOCUMENTS

CN    105190429 A    12/2015
KR    1999-0015579 U    5/1999
(Continued)

OTHER PUBLICATIONS

International Search Report dated Jan. 23, 2020 in International Application No. PCT/KR2019/013036.
(Continued)

*Primary Examiner* — Antoinette T Spinks
(74) *Attorney, Agent, or Firm* — Saliwanchik, Lloyd & Eisenschenk

(57) ABSTRACT

Embodiments relate to a camera actuator and a camera module including same. The camera actuator according to an embodiment comprises a lens unit, a shaper unit, a first driver coupled to the shaper unit, and a second driver arranged to correspond to the first driver. The shaper unit may include a first protruding region having a first protrusion which protrudes from a surface of a first side and a second protrusion which protrudes from another surface of the first side and is separated from the first protrusion; and a second protruding region comprising a third protrusion which protrudes from a surface of a second side and a fourth protrusion which protrudes from another surface of the second side and is separated from the third protrusion.

18 Claims, 26 Drawing Sheets

(58) Field of Classification Search
CPC .... G03B 5/02; G03B 2205/0069; G03B 27/646; G03B 30/00; G02B 13/0065
See application file for complete search history.

(56) References Cited

U.S. PATENT DOCUMENTS

| | | |
|---|---|---|
| 2014/0340537 A1 | 11/2014 | Eromaki |
| 2015/0062706 A1 | 3/2015 | Lim et al. |
| 2016/0274328 A1 | 9/2016 | Shin et al. |
| 2016/0306269 A1* | 10/2016 | Gyoten ................ G03B 21/142 |
| 2018/0109660 A1* | 4/2018 | Yoon .................. G02B 13/0035 |
| 2018/0136372 A1* | 5/2018 | Patscheider .......... G02B 26/004 |
| 2018/0239161 A1 | 8/2018 | Seol et al. |

FOREIGN PATENT DOCUMENTS

| | | |
|---|---|---|
| KR | 10-2009-0122892 A | 12/2009 |
| KR | 10-2018-0041040 A | 4/2018 |
| KR | 10-2018-0096073 A | 8/2018 |

OTHER PUBLICATIONS

Office Action dated Oct. 9, 2021 in Chinese Application No. 201980065833.7.

\* cited by examiner

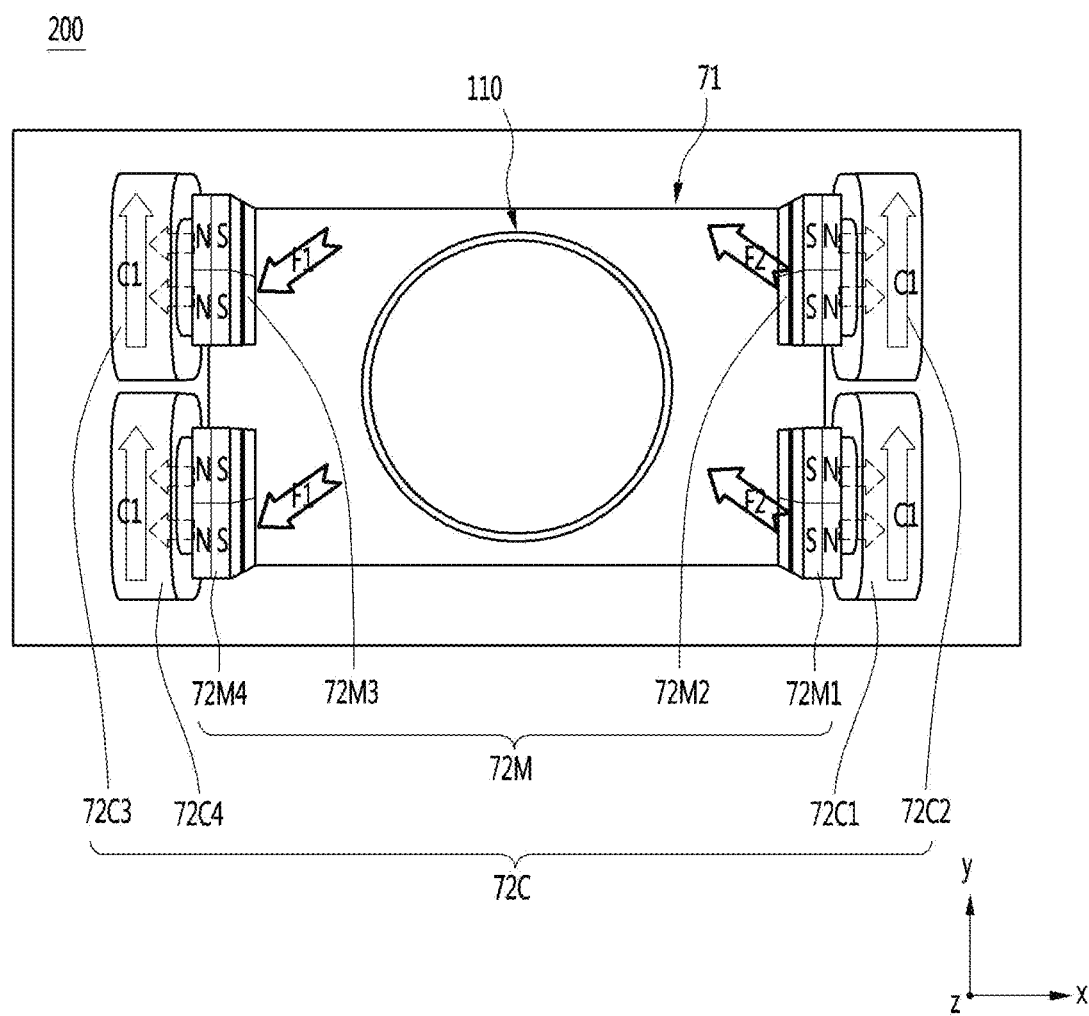

CAMERA ACTUATOR AND A CAMERA MODULE INCLUDING THE SAME

CROSS-REFERENCE TO RELATED APPLICATIONS

This application is the U.S. national stage application of International Patent Application No. PCT/KR2019/013036, filed Oct. 4, 2019, which claims the benefit under 35 U.S.C. § 119 of Korean Application No. 10-2018-0119237, filed Oct. 5, 2018, the disclosures of each of which are incorporated herein by reference in their entirety.

TECHNICAL FIELD

An embodiment relates to a camera actuator and a camera module including the same. Specifically, it relates to an optical image stabilizer (OIS) actuator and a camera module including the same.

BACKGROUND ART

The camera module performs a function of photographing a subject and storing it as an image or video, and is installed in mobile terminals such as mobile phones, laptops, drones, and vehicles.

On the other hand, portable devices such as smartphones, tablet PCs, and laptops have built-in micro camera modules, and these camera modules automatically adjust the distance between the image sensor and the lens to align the focal length of the lens such that autofocus function (AF) can be performed.

In addition, a recent camera module may perform a zooming function of zooming up or zooming out of photographing by increasing or decreasing the magnification of a distant subject through a zoom lens.

In addition, recently, camera modules employ image stabilization (IS) technology to correct or inhibit image shake due to unstable fixing devices or camera movement caused by user movement.

Such image stabilization (IS) technology includes optical image stabilizer (OIS) technology and image stabilization technology using an image sensor.

The OIS technology is a technology that corrects motion by changing the path of light, and the image stabilization technology using an image sensor corrects movement in a mechanical and electronic manner, and OIS technology is more widely adopted.

On the other hand, the image sensor has a higher resolution as it goes to a higher pixel, so that the size of a pixel decreases. As the pixel becomes smaller, the amount of light received at the same time decreases. Therefore, in a dark environment, the higher the pixel camera, the more severe the blurring of the image due to hand shake appears as the shutter speed decreases.

Accordingly, in order to capture an image without distortion using a high-pixel camera in a dark night or in a video, the OIS function has recently been essentially adopted.

On the other hand, OIS technology is a method of correcting the image quality by correcting the optical path by moving the lens or image sensor of the camera. In particular, the OIS technology detects camera movement using a gyro sensor and the distance that the lens or image sensor should move can be calculated using the detected movement.

For example, the OIS correction methods include a lens shift method and a module tilting method. The lens shift method moves only the lens in the camera module to rearrange the center of the image sensor and the optical axis. On the other hand, the module tilting method moves the entire module including the lens and image sensor.

In particular, the module tilting method has a wider correction range than the lens shift method, and since the focal length between the lens and the image sensor is fixed, there is an advantage of minimizing image deformation.

Meanwhile, in the case of the lens shift method, a Hall sensor is used to detect the position and movement of the lens. On the other hand, in the module tilting method, a photo reflector is used to detect the movement of the module. However, both methods use a gyro sensor to detect the movement of the camera user.

The OIS controller uses the data recognized by the gyro sensor to predict where the lens or module should move to compensate for the user's movement.

Depending on the recent technological trend, ultra-slim and ultra-micro camera modules are required. In the micro-camera module, there is a space limitation for OIS operation, which makes it difficult to implement OIS functions applied in general large cameras. So there is a problem in that the OIS operation cannot be implemented in a very small camera module.

In addition, in the conventional OIS technology, the size of the camera module is limited, and the OIS driving part is disposed on the side of the solid lens assembly in the limited size. Accordingly, there is a problem that it is difficult to secure the amount of light because the size of the lens that is the target of OIS becomes small.

In particular, in order to achieve the best optical characteristics in a camera module, the alignment between lens groups must be well matched when implementing OIS through lens movement or tilting of the module. However, in the conventional OIS technology, a decent, in which the spherical center between lens groups deviates from the optical axis, or a tilt, which is a lens inclination phenomenon, occurs. When the decent or the tilt occurs, the angle of view changes or out of focus occurs, there is a problem that adversely affects image quality and resolution.

In addition, in the conventional OIS technology, it is possible to implement AF or Zoom at the same time as OIS driving. Due to the space constraints of the camera module and the location of the driving part of the existing OIS technology, the OIS magnet and the AF or Zoom magnet are placed close together, causing magnetic field interference. So there is a problem in that it is not driven properly and causes a decent or tilt phenomenon.

In addition, the conventional OIS technology requires a mechanical driving device for lens movement or tilting of the module, so the structure is complicated and power consumption is increased.

DISCLOSURE

Technical Problem

One of the technical problems of the embodiment is to provide an ultra-slim, ultra-micro camera actuator and a camera module including the same.

In addition, one of the technical problems of the embodiment is to provide a camera actuator and a camera module including the same so that a sufficient amount of light can be secured by solving the size limitation of the lens in the lens assembly of the optical system when implementing OIS.

In addition, one of the technical problems of the embodiment is to provide a camera actuator and a camera module including the same, capable of exhibiting the best optical characteristics by minimizing the occurrence of a decent or tilt phenomenon when implementing OIS.

In addition, one of the technical problems of the embodiment is to provide a camera actuator, and a camera module including the same, capable of inhibiting magnetic field interference with a magnet for AF or Zoom when implementing OIS.

In addition, one of the technical problems of the embodiment is to provide a camera actuator and a camera module including the same, capable of implementing OIS with low power consumption.

The technical problem of the embodiment is not limited to that described in this item, and includes what can be inferred from the entire description of the invention.

Technical Solution

The camera actuator according to the embodiment can include a lens unit 222c, a shaper unit 222 disposed on the lens unit 222c, a first driving part 72M coupled to the shaper unit 222, and a second driving part 72C disposed to correspond to the first driving part 72M.

The shaper unit 222 may include a shaper body 222a including a first side surface and a second side surface corresponding to the first side surface, and a first protrusion region b12 protruding from the first side surface of the shaper body 222a and a second protruding region b34 protruding from the second side surface of the shaper body.

The first protruding region b12 may include a first protrusion 222b1 protruding from one surface of the first side and a second protrusion 222b2 protruding from the other surface of the first side and spaced apart from the first protrusion 222b1.

The second protruding region b34 may include a third protrusion 222b3 protruding from one surface of the second side and a fourth protrusion 222b4 protruding from the other surface of the second side and spaced apart from the third protrusion 222b3.

The first driving part 72M may include first to fourth unit driving parts 72M1, 72M2, 72M3, and 72M4 respectively coupled to the first to fourth protrusions 222b1, 222b2, 222b3, 222b4.

The second driving part 72C may include fifth to eighth unit driving parts 72C1, 72C2, 72C3, and 72C4 respectively corresponding to the first to fourth unit driving parts 72M1, 72M2, 72M3, and 72M4.

Each of the first to fourth unit driving parts 72M1, 72M2, 72M3, and 72M4 may include first to fourth magnets.

Each of the fifth to eighth unit driving parts 72C1, 72C2, 72C3, and 72C4 may include first to fourth coils.

The first, second unit driving parts 72M1 and 72M2 may include first and second magnet frames 72MH1 on which the first to second magnets are disposed.

The first magnet frame and the second magnet frame may be integrally formed.

The first unit driving part 72M1 may include a first yoke 72MY coupled with the first protrusion, and the first magnet frame 72MH1 has a frame groove 72MR in which the first yoke is disposed.

The embodiment further may include a housing 210 in which the second driving part 72C is disposed, The housing 210 may include a housing body 212 in which the lens unit is disposed, a first housing side part 214P1 disposed in a direction in which the first protruding region b12 protrudes, and a second housing side part 214P2 disposed in in which the second protruding region b34 protrudes.

The lens unit 222c may include a light-transmitting support part 222c2, a light-transmitting support part 222c2, a tunable prism, a second light-transmitting support part (not shown), or a liquid lens.

The lens unit 222c may function as a lens in addition to a prism function for changing a path of light, but is not limited thereto.

The first housing side part 214P1 and the second housing side part 214P2 may include a driving part hole 214H in which the second driving part 72C is disposed.

The housing may include first to fourth jig holes formed to overlap the first to fourth protrusions in a vertical direction.

The housing may include an opening 212H formed between the first to fourth jig holes.

In addition, the camera actuator according to the embodiment may include a housing 210, an image shaking control unit 220 disposed on the housing 210, including a shaper unit 222 and a first driving part 72M, and a second driving part 72C disposed on housing 210.

The shaper unit 222 may include a shaper body 222a, a protrusion 222b extending laterally from the shaper body 222a and coupled to the first driving part 72M, and a lens unit 222c disposed on the shaper body 222a.

The embodiment may include a prism unit 230 disposed on the image shaking control unit 220 and having a fixed prism 232.

The lens unit 222c may include a light-transmitting support part 222c2, a light-transmitting support part 222c2, a variable prism 222cp, or a liquid lens.

Second light-transmitting support is not shown. The first driving part 72M includes a magnet coupled to the protrusion 222, The second driving part 72C may include a coil coupled to the shaper body 222a.

The protrusion 222 may include a first protrusion 222b1 and a second protrusion 222b2 respectively extending from the shaper body 222a to one side. A first support part b1q that is an end of the first protrusion 222b1 and a second support part b2q that is an end of the second protrusion 222b2 may be connected to each other.

The protrusion 222 may include a first protrusion 222b1 and a second protrusion 222b2 respectively extending from the shaper body 222a to one side, and a support part b1e which is an end of the first protrusion 222b1 and a second support part b2e which is an end of the second protrusion part 222b2, may be spaced apart from each other.

The camera module of the embodiment may include a lens assembly, an image sensor unit disposed on one side of the lens assembly, and any one camera actuator disposed on the other side of the lens assembly.

Advantageous Effects

According to the embodiment, there is a technical effect of providing an ultra-slim, ultra-micro camera actuator and a camera module including the same.

For example, according to an embodiment, the image shaking control unit 220 may be disposed to overlap each other by using a space under the prism unit 230. Accordingly, the embodiment has a technical effect of providing an ultra-slim, ultra-micro camera actuator and a camera module including the same.

In addition, according to the embodiment, there is a technical effect of providing a camera actuator and a camera module including the same, capable of securing a sufficient amount of light by removing a size limitation of a lens in a lens assembly of an optical system when implementing OIS For example, according to an embodiment, there is a technical effect that can provide a camera module and a camera actuator capable of securing a sufficient amount of light for solving the size limitation of the lens in the lens assembly of the optical system when implementing OIS by disposing the image shaking control unit 220 under the prism unit 230.

In addition, according to the embodiment, there is a technical effect of providing a camera actuator and a camera module including the same, capable of exhibiting the best optical characteristics by minimizing the occurrence of a decent or a tilt phenomenon when implementing OIS.

For example, in the embodiment, the image shake control unit 220 may be stably disposed on the housing 210. In addition, a lens unit 222c having a variable prism 222cp including a shaper unit 222 and a first driving part 72M to be described later may be implemented (see FIGS. 4A and 7B). Accordingly, the embodiment has a technical effect of providing a camera actuator and a camera module including the same, capable of exhibiting the best optical characteristics by minimizing the occurrence of a decent or tilt phenomenon when implementing an OIS.

In addition, according to the embodiment, when implementing OIS, there is a technical effect of providing a camera actuator and a camera module including the same, capable of inhibiting magnetic field interference with a magnet for AF or zoom.

For example, according to an embodiment, when OIS is implemented, the first driving part 72M, which is a magnet driving part, may be disposed on the second camera actuator 200 separated from the first camera actuator 100. Accordingly, the embodiment has a technical effect of providing a camera actuator, and a camera module including the same, capable of inhibiting magnetic field interference with an AF of the first camera actuator 100 or a magnet for zoom when implementing OIS.

In addition, according to the embodiment, there is a technical effect of providing a camera actuator and a camera module including the same, capable of implementing OIS with low power consumption.

For example, unlike moving a plurality of solid lenses, according to the embodiment, a first driving part 72M as a magnet driving part and a second driving part 72C as a coil driving part can drive the shaper unit 222 to control the lens unit 222c including the variable prism such that the OIS can be implemented. Accordingly, there is a technical effect of providing a camera actuator and a camera module including the same, capable of implementing OIS with low power consumption.

In addition, according to the embodiment, the prism unit 230 and the lens unit 222c including the variable prism may be arranged very close. Accordingly, even if the optical path change is finely performed in the lens unit 222c, there is a special technical effect of ensuring a wide optical path change in the actual image sensor unit.

For example, according to the embodiment, the lens unit 222c including the fixed prism 232 and the variable prism may be arranged very close. On the other hand, the distance between the lens unit 222c and the image plane 190P of the first lens assembly (not shown) can be relatively widely secured. Accordingly, in the variable prism 222cp, the first distance D1δ reflected on the image plane 190P can be secured widely according to the change in the slope of the predetermined angle Θ. Therefore, even if the optical path change is finely performed in the lens unit 222c, there is a special technical effect of ensuring a wide range of optical path changes in the actual image sensor unit.

In addition, according to the embodiment, the first protrusion 222b1 and the second protrusion 222b2 of the shaper unit 222 may be spaced apart, and the third protrusion 222b3 and the fourth protrusion 222b4 may be spaced apart from each other. Accordingly, when each of the protrusions moves along the x-axis or y-axis, the other protrusions may be less affected. Therefore, when driving in each axial direction, the amount of error change generated compared to the target value (ideal) is significantly reduced, thereby improving performance (see FIG. 12).

In addition, in the embodiment, a jig hole ZH may be provided in the housing 210, and a predetermined jig is firmly coupled to the jig hole ZH of the housing 210 during the assembly process of the second camera actuator 200. At this time, the jig may pass through the jig hole ZH and be led out to the upper side of the housing 210, and the shaper unit 222 may be firmly disposed on the protruding jig. The first to fourth jigs may be disposed to overlap first to fourth protrusions 222b1, 222b2, 222b3, 222b4 of the shaper body in a vertical direction. Thereafter, the first driving part 72M, the second driving part 72C, and the like may be firmly coupled to the shaper unit 222, and there is a special technical effect of remarkably inhibiting the occurrence of a tilt (see FIG. 13B above).

The technical effects of the embodiments are not limited to those described in this item, and include those that can be grasped from the entire description of the invention.

DESCRIPTION OF DRAWINGS

FIGS. 8 to 9B are diagrams illustrating a first operation of the second camera actuator of the embodiment.

MODE FOR INVENTION

Figure 1:
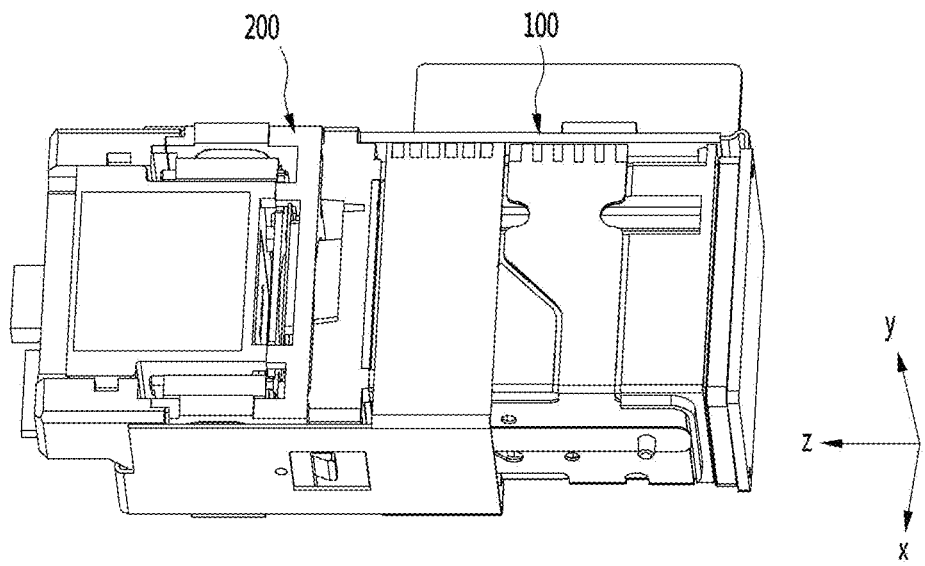
FIG. 1 is a perspective view showing the camera module of the embodiment.

Hereinafter, embodiments will be described in detail with reference to the accompanying drawings. Since the embodiments can be modified in various ways and have various forms, specific embodiments will be illustrated in the drawings and described in detail in the text. However, this is not intended to limit the embodiments to a specific type of disclosure, and should be understood to include all changes, equivalents, and substitutes included in the spirit and scope of the embodiments.

Terms such as "first" and "second" may be used to describe various elements, but the elements should not be limited by the terms. The terms are used for the purpose of distinguishing one component from other components. In addition, terms specifically defined in consideration of the configuration and operation of the embodiment are only for describing the embodiment, and do not limit the scope of the embodiment.

In the description of the embodiment, in the case where it is described as being formed in "up/down" or "above/below" of each element, includes both two components directly contacting each other, or one or more other configurations formed indirectly between the two configurations. In addition, when expressed as "up/down" or "above/below", it may include not only an up direction but a down direction based on one configuration.

In addition, the relational terms such as "upper/upper portion/up" and "lower/lower portion/down", etc., used below, do not require or imply any physical or logical relationship or order between such components or elements, it may be used to distinguish one component or element from another component or element.

Embodiment

FIG. 1 is a perspective view showing a camera module 1000A according to the embodiment.

In the drawings of the embodiment, a direction parallel to the optical axis may be referred to as a z-axis, and a plane perpendicular to the optical axis may be referred to as an xy plane. In the xy plane, the x-axis and y-axis may be defined in a direction perpendicular to each other, the x-axis may be defined as a horizontal coordinate axis, and the y-axis may be defined as a vertical coordinate axis, but the present invention is not limited thereto.

The first camera module 1000A of the embodiment may include a single or a plurality of camera actuators. For example, the first camera module 1000A of the embodiment may include a first camera actuator 100 and a second camera actuator 200.

The first camera actuator 100 may support one or a plurality of lenses, and may perform an auto focusing function or a zoom function by moving up and down the lenses in response to a control signal from a predetermined controller. In addition, the second camera actuator 200 may be an OIS (Optical Image Stabilizer) actuator, but is not limited thereto.

Hereinafter, the OIS actuator, which is the second camera actuator 200, will be mainly described, and thereafter, the first camera actuator 100 will be described with reference to the drawings below FIG. 17A.

Figure 2A:
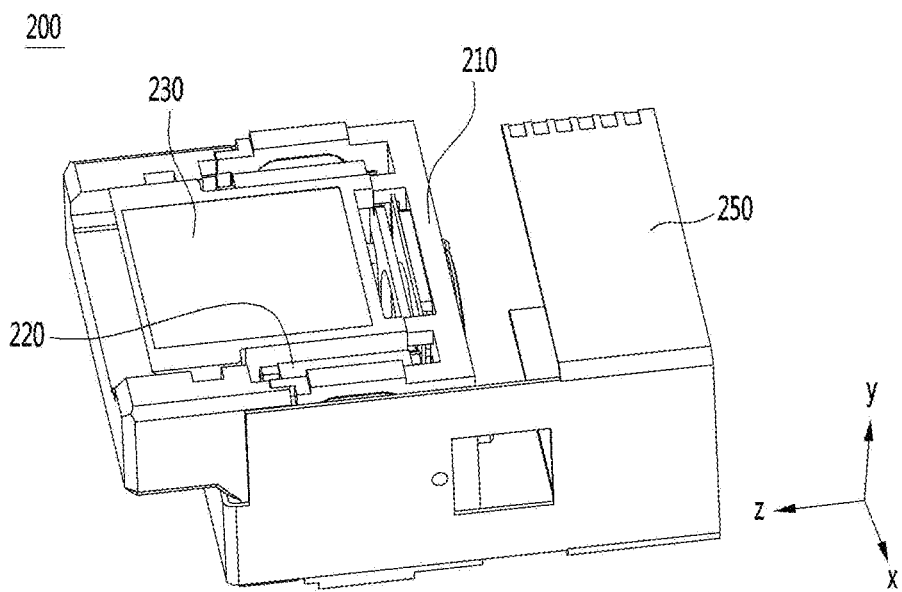
FIG. 2A is a perspective view of a second camera actuator in a first direction in the camera module of the embodiment shown in FIG. 1.
Figure 2B:
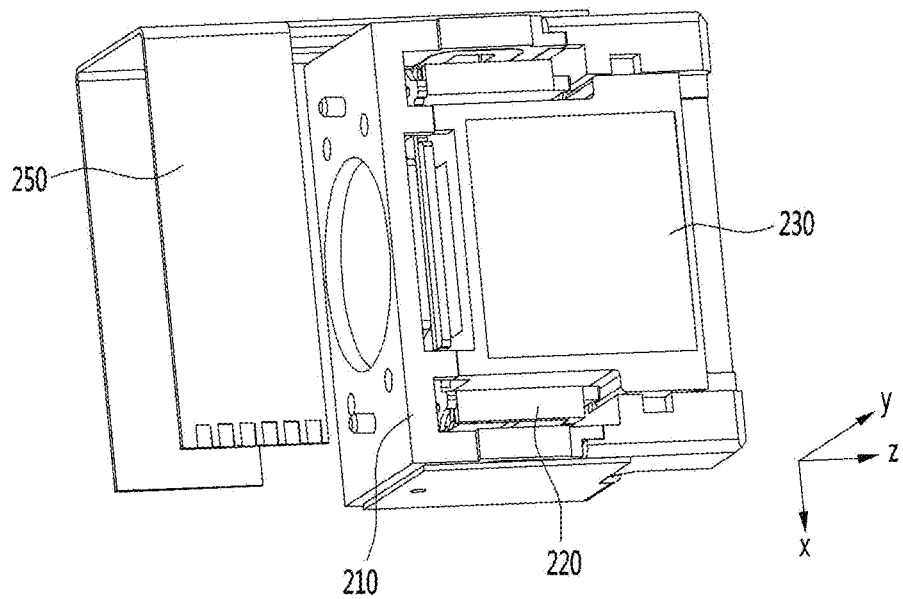
FIG. 2B is a perspective view of a second camera actuator in a second direction in the camera module of the embodiment shown in FIG. 1.

Next, FIG. 2A is a perspective view in a first direction of the second camera actuator 200 in the camera module 1000A of the embodiment shown in FIG. 1, and FIG. 2B is a camera module 1000A of the embodiment shown in FIG. 2A perspective view in a second direction of the second camera actuator 200.

Referring to FIGS. 2A and 2B, the second camera actuator 200 of the embodiment includes a housing 210, an image shake control unit 220 disposed on the housing 210, a prism unit 230 disposed on the image shake control unit 220, and a second driving part 72C (refer to FIG. 3A) electrically connected to the second circuit board 250.

Through this, according to the embodiment, there is a technical effect of providing an ultra-slim, ultra-micro camera actuator and a camera module including the same by providing the image shaking control unit 220 disposed on the housing 210.

In addition, according to the embodiment, by disposing the image shaking control unit 220 under the prism unit 230, there is a technical effect of securing a sufficient amount of light by removing the size limitation of the lens in the lens assembly of the optical system when implementing OIS.

In addition, according to an embodiment, the image shake control unit 220 can be stably disposed on the housing 210, and the shaper unit 222 and the first driving part 72M to be described later (see FIGS. 4A and 7B) such that there is a technical effect of minimizing the occurrence of a decent or a tilt phenomenon when implementing OIS through the lens unit 222c having a variable prism 222cp and the embodiment can produce the best optical characteristics.

In addition, according to an embodiment, when OIS is implemented, the first driving part 72M, which is a magnet driving part, is disposed on the second camera actuator 200 separated from the first camera actuator 100. Accordingly, the first driving part 72M, which is a magnet driving part, has a technical effect of inhibiting magnetic field interference with the AF of the first camera actuator 100 or the magnet for zoom.

In addition, unlike moving a plurality of conventional solid lenses, the embodiment may implement OIS using the shaper unit 222 and the first driving part 72M for the lens unit 222c having the variable prism 222cp. Accordingly, the embodiment has a technical effect capable of implementing OIS with low power consumption.

The second camera actuator 200 of the embodiment will be described in more detail with reference to the following drawings.

Figure 3A:
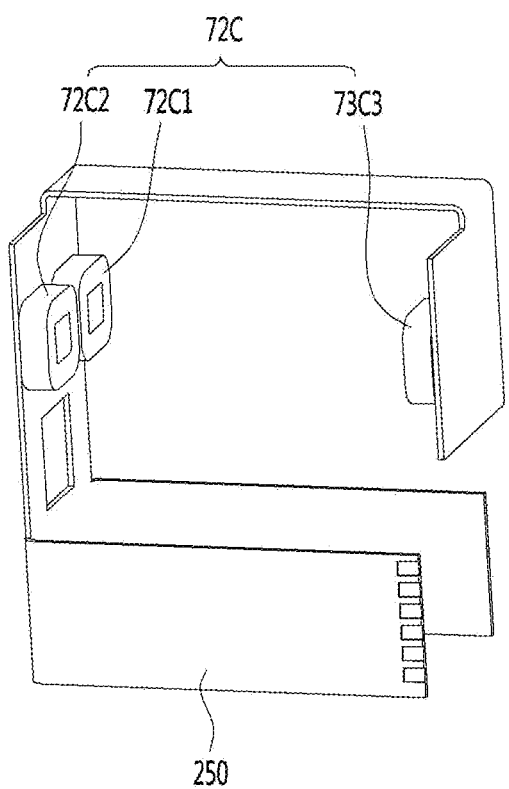
FIG. 3A is a perspective view of a first circuit board and a coil part of the second camera actuator of the embodiment shown in FIG. 2B.
Figure 3B:
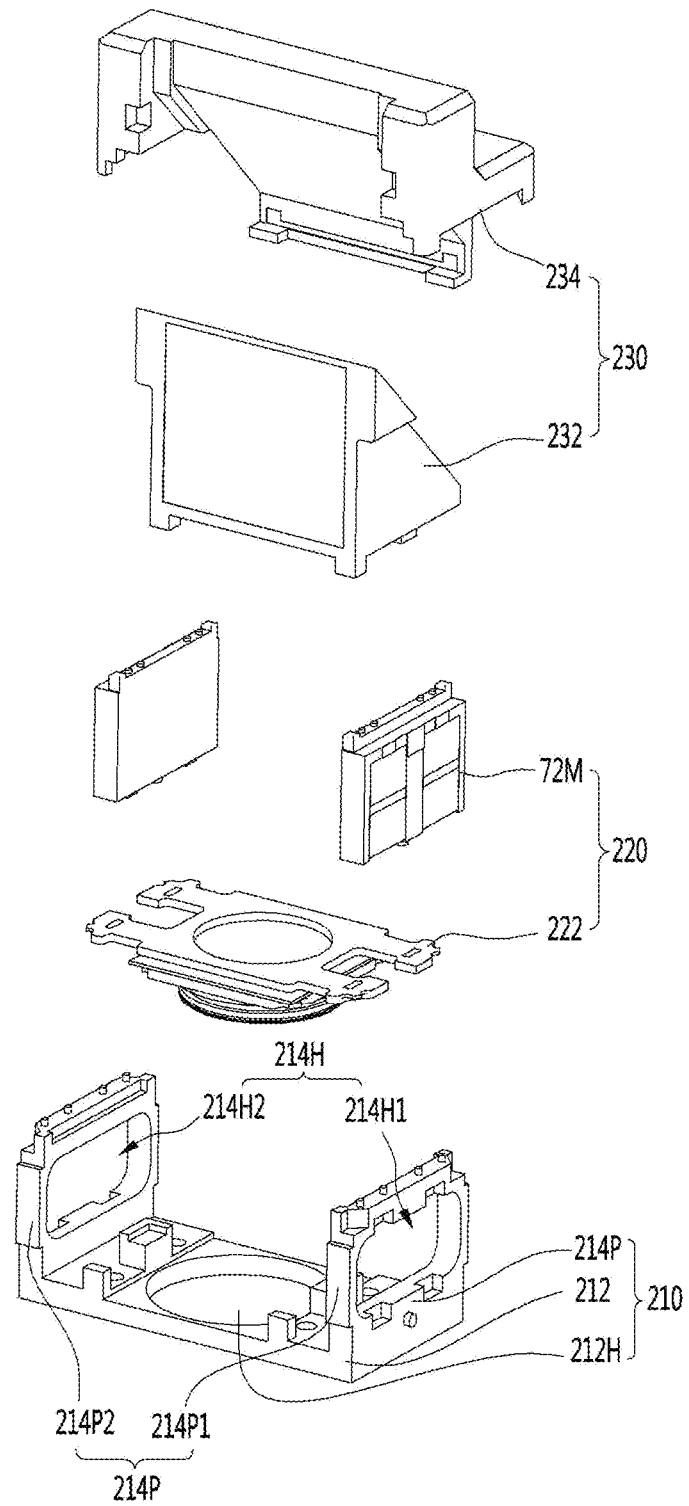
FIG. 3B is a partially exploded perspective view of the second camera actuator of the embodiment shown in FIG. 2B.
Figure 3C:
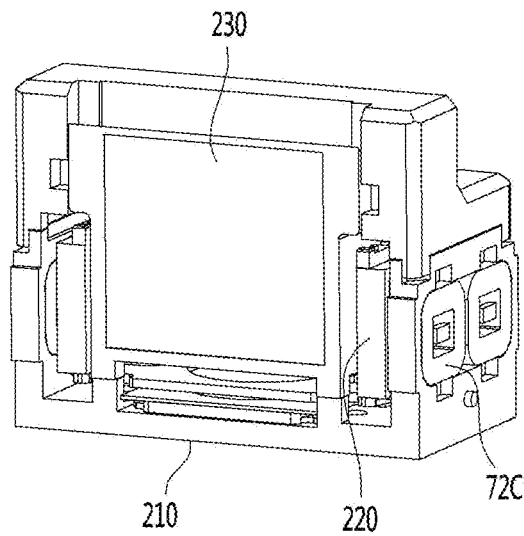
FIG. 3C is a perspective view of the first circuit board removed from the second camera actuator of the embodiment shown in FIG. 2B.

FIG. 3A is a perspective view of a second circuit board 250 and a second driving part 72C of the second camera actuator 200 of the embodiment shown in FIG. 2B, and FIG. 3B is a partially exploded perspective view of a second camera actuator 200 of the embodiment shown in FIG. 2B, and FIG. 3C is a perspective view of the second circuit board 250 removed from the second camera actuator of the embodiment shown in FIG. 2B.

First, referring to FIG. 3A, the second circuit board 250 may be connected to a predetermined power supply unit (not shown) to apply power to the second driving part 72C. The second circuit board 250 is a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

The second driving part 72C may include a single or a plurality of unit driving parts, and may include a plurality of coils. For example, the second driving part 72C may include a fifth unit driving part 72C1, a sixth unit driving part 72C2, a seventh unit driving part 72C3, and an eighth unit driving part (not shown).

In addition, the second driving part 72C may further include a Hall sensor (not shown) to recognize the position of the first driving part 72M (see FIG. 3B) to be described later. For example, a first Hall sensor (not shown) in the fifth unit driver 72C1 and a second Hall sensor (not shown) in the seventh unit driver 72C3 may be further included.

According to the embodiment, the image shaking control unit 220 may be stably disposed on the housing 210. In addition, OIS may be implemented through the lens unit 222c including the variable prism using the second driving part 72C, which is a coil driving part, and the first driving part 72M, which is a magnet driving part. Accordingly, in the embodiment, the occurrence of decent or tilt can be minimized and the best optical characteristics can be achieved.

In addition, unlike moving a plurality of conventional solid lenses, the embodiment can implement OIS by controlling the lens unit 222c having a variable prism by driving the shaper unit 222 using the first driving unit 72M, which is a magnet driving unit, and the second driving unit 72C, which is a coil driving unit. Accordingly, there is a technical effect that can implement OIS with low power consumption.

Next, referring to FIGS. 3B and 3C, the second camera actuator 200 of the embodiment includes a housing 210, an image shaking control unit 220 disposed on the housing 210, including a shaper unit 222, and a first driving part 72M, a second driving part 72C disposed on the housing 210, and a prism unit 2230 disposed on the image shaking control unit 220 and including a fixed prism 232.

Referring to FIG. 3B, the housing 210 may include a predetermined opening 212H through which light can pass through the housing body 212. In addition, the housing 210 may include a housing side part 214P extending upward of the housing body 212 and including a driving unit hole 214H through which the second driving unit 72C can be disposed.

For example, the housing 210 may include a first housing side part 214P1 extending upward of the housing body 212 and including a first driving portion hole 214H1 in which a second driving portion 72C can be disposed. In addition, the housing 210 may include a second housing side part 214P2 including a second driving unit hole 214H2 in which the second driving unit 72C can be disposed.

According to an embodiment, the second driving unit 72C may be disposed on the housing side part 214P, and the second driving unit 72C generates an electromagnetic force together with the first driving unit 72M, which is a magnet driving unit, so that the shaper unit 222 can be driven. Accordingly, by driving the shaper unit 222 to control the lens unit 222c including the variable prism to implement OIS, it is possible to implement OIS with low power consumption.

In addition, according to an embodiment, the lens unit 222c including the variable prism can be controlled through the second driving part 72C stably fixed to the housing side part 214P and the first driving part 72M, which is a magnet driving part, thereby implementing OIS. There is a technical effect that can produce the best optical properties by minimizing the occurrence of decent or tilt.

Next, the fixed prism 232 may be a right angle prism, and may be disposed inside the first driving part 72M of the image shaking control unit 220. In addition, in an embodiment, a prism cover 234 can disposed above the fixed prism 232 such that the fixed prism 232 can be closely coupled to the housing 210. There is a technical effect that inhibits prism tilt and does not cause decenter when the prism in the second camera actuator 200 is used.

In addition, according to the embodiment, there is a technical effect of providing an ultra-slim, ultra-micro camera actuator and a camera module including the same by utilizing the space under the prism unit 230 and arranging the image shaking control unit 220 to overlap each other.

In particular, according to the embodiment, since the prism unit 230 and the lens unit 222c including the variable prism can be arranged very close, even if the optical path change is made fine in the lens unit 222c, there is a special technical effect in that the optical path change can be widened in the actual image sensor unit.

Figure 7A:
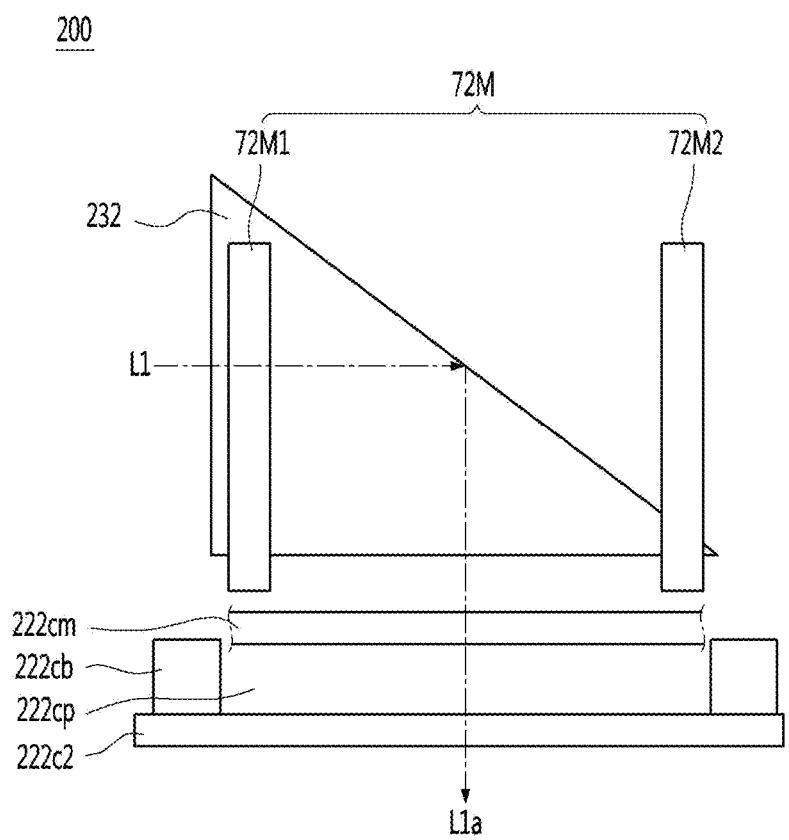
FIG. 7A to 7B are exemplary views of operation of the second camera actuator of the embodiment.
Figure 7B:
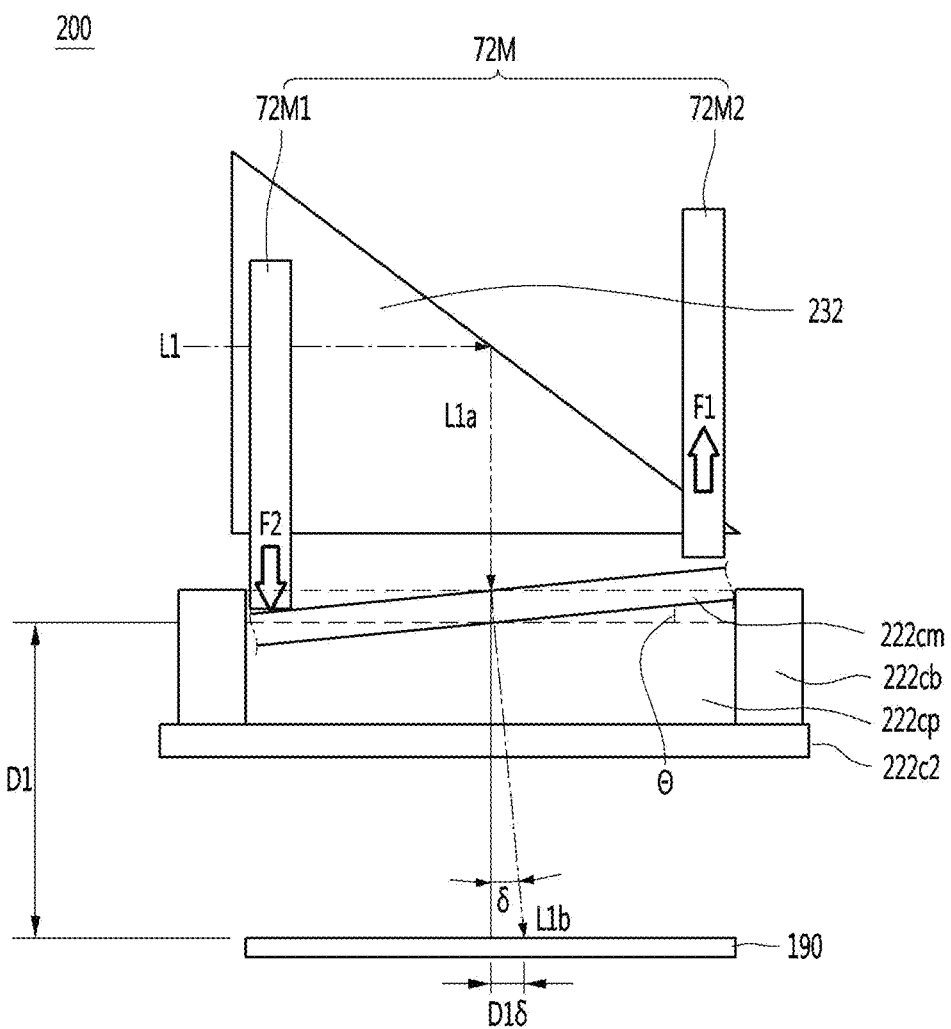

For example, referring to FIG. 7B for a moment, the second movement path L1a of the light beam changed by the fixed prism 232 may be changed from the variable prism 222cp to be changed to the third movement path L1b.

In this case, according to the embodiment, the lens unit 222c including the fixed prism 232 and the variable prism can be arranged very close, and the image plane 190P of the lens unit 222c and the first lens assembly (not shown) distance can be secured relatively long.

Accordingly, it is possible to secure a wide first distance D1δ reflected on the image plane 190P according to the change of the slope of the predetermined angle Θ in the variable prism 222cp, so that the optical path change in the lens unit 222c is finely performed. Even so, there is a special technical effect that can secure a wide range of optical path changes in the actual image sensor unit.

Figure 4A:
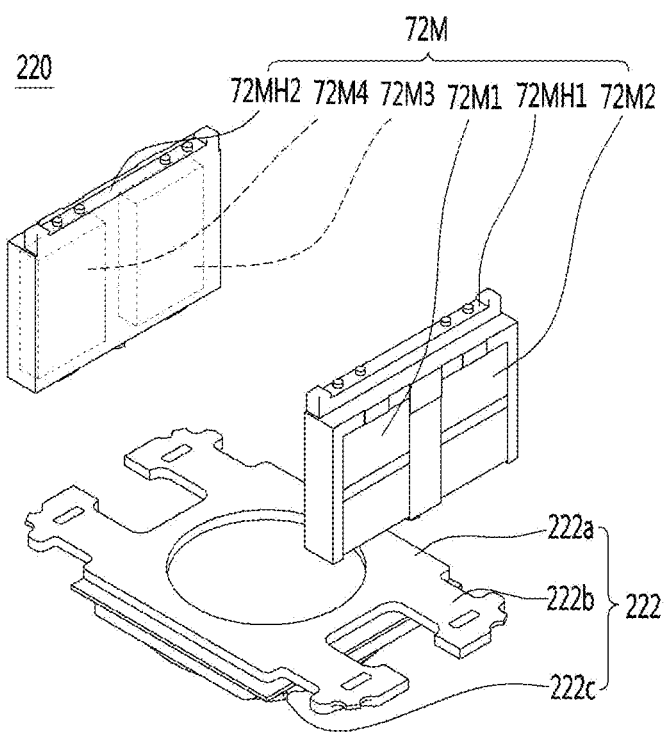
FIG. 4A is an exploded perspective view of the image shaking control unit of the second camera actuator of the embodiment shown in FIG. 3B.
Figure 4B:
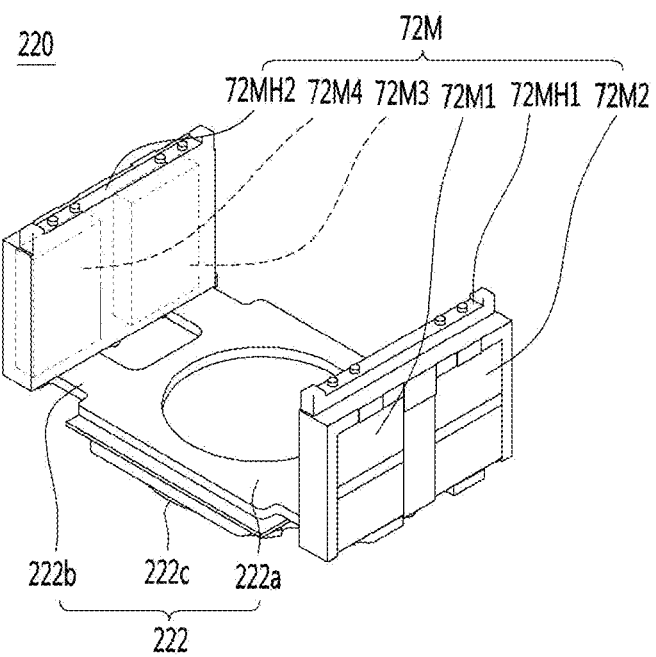
FIG. 4B is a perspective view of an image shaking control unit of the second camera actuator of the embodiment shown in FIG. 4A.
Figure 4C:
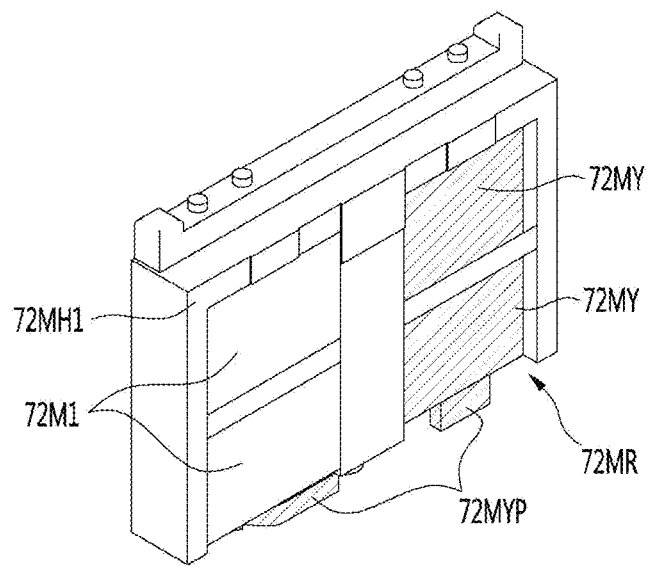
FIG. 4C is an exploded perspective view of a first driving part in the image shaking control unit shown in FIG. 4A.

Next, FIG. 4A is an exploded perspective view of the image shaking control unit 220 of the second camera actuator 200 of the embodiment shown in FIG. 3B, and FIG. 4B is a perspective view of the second camera actuator of the embodiment shown in FIG. 4A combined with the image shaking control unit 220, and FIG. 4C is an exploded perspective view of the first driving part 72M in the image shaking control unit 220 shown in FIG. 4A.

Referring to FIGS. 4A and 4B, in the embodiment, the image shake control unit 220 may include a shaper unit 222 and a first driving part 72M.

The shaper unit 222 may include a shaper body 222a having a hole through which light can pass, a protrusion 222b extending laterally from the shaper body 222a and coupled to the first driving unit 72M in a first vertical direction.

In addition, the shaper unit 222 may include a lens unit 222c disposed on the shaper body 222a in a second vertical direction opposite to the first vertical direction and including a variable prism.

Accordingly, the image shaking control unit 220 according to the embodiment may include a shaper unit 222 and a first driving unit 72M, and the lens unit 222c may implement OIS including a variable prism. Accordingly, there is a technical effect of minimizing the occurrence of a decent or a tilt phenomenon to produce the best optical characteristics.

Specifically, referring to FIGS. 4A and 4B, the first driving unit 72M may include a single or a plurality of magnet frames 72MH1 and 72MH2 coupled with the protrusion 222b and a unit driving part disposed the magnet frames 72MH1 and 72MH2.

For example, the first driving unit 72M may include a first magnet frame 72MH1 and a second magnet frame 72MH2. In addition, the first unit driving part 72M1 and the second unit driving part 72M2 may be disposed on the first magnet frame 72MH1. The third unit driving part 72M3 and the fourth unit driving part 72M4 may be disposed on the second magnet frame 72MH2.

Each of the first to fourth unit driving parts 72M1, 72M2, 72M3, and 72M4 may include first to fourth magnets.

FIG. 4C is an exploded perspective view of the first driving part 72M in the image shaking control unit 220 shown in FIG. 4A.

In an embodiment, the first driving part 72M may further include yokes 72MY disposed in the first and second magnet frames 72MH1 and 72MH2 to block interference of a magnetic field.

For example, the first magnet frame 72MH1 of the first driving part 72M may have a frame groove 72MR, and a yoke 72MY may be disposed in the frame groove 72MR. Thereafter, the first unit driver 72M1 and the second unit driver 72M2 may be respectively disposed on the yoke 72MY.

In this case, the yoke 72MY may have a yoke protrusion 72MYP and may be firmly coupled to the protrusion 222b of the shaper unit 222.

Figure 5:
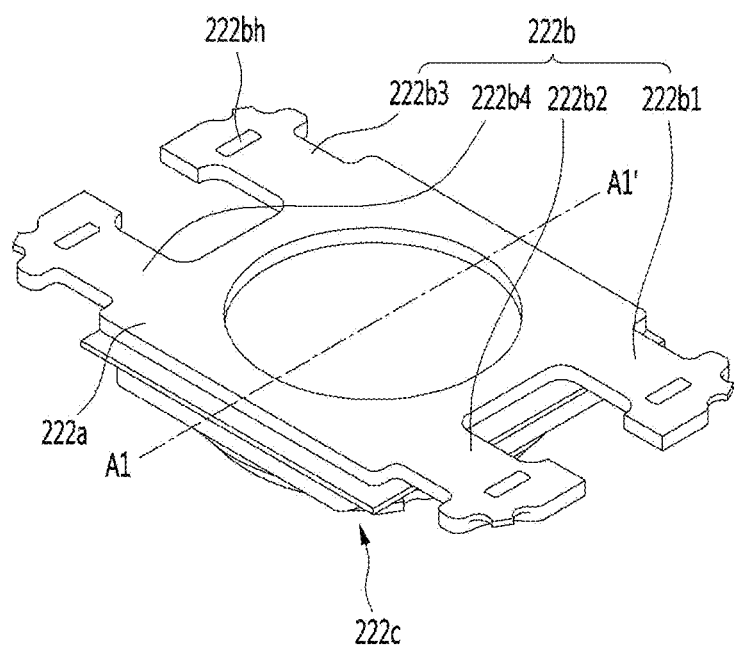
FIG. 5 is a perspective view of a shaper unit of the second camera actuator of the embodiment shown in FIG. 4A.

Next, FIG. 5 is a perspective view of the shaper unit 222 of the second camera actuator of the embodiment shown in FIG. 4A.

Referring to FIG. 5, the shaper unit 222 may include the shaper body 222a having an opening through which light can pass, a protrusion 222b extending laterally from the shaper body 222a and coupled to the first driving part 72M in a first vertical direction, and a lens unit 222c disposed on the shaper body 222a in a second vertical direction opposite to the first vertical direction and including a variable prism 222cp.

Specifically, the shaper unit 222 of the embodiment may include a plurality of magnet support portions extending from the shaper body 222a to both sides, respectively. For example, the shaper unit 222 may include a first protrusion 222b1 and a second protrusion 222b2 branching from the shaper body 222a to a first side and extending. In addition, the shaper unit 222 may include a third protrusion 222b3 and a fourth protrusion 222b4 branching and extending toward the second side.

The first driving part 72M may include first to fourth unit driving parts 72M1, 72M2, 72M3, and 72M4 respectively coupled to the first to fourth protrusions 222b1, 222b2, 222b3, 222b4.

Referring to FIG. 5, in an embodiment, the shaper unit 222 may include a coupling groove 222bh in the magnet support portion to be coupled to a magnet frame. Through this, the image shaking control unit 220 may be combined as shown in FIG. 4B.

According to the embodiment, in a state in which the first driving part 72M is firmly coupled to the shaper unit 222, the OIS is implemented through the optical path control of the lens unit 222c having a variable prism. So, there is a technical effect that the embodiment can produce the best optical characteristics by minimizing the occurrence of thereby decent or tilt phenomena.

Figure 6:
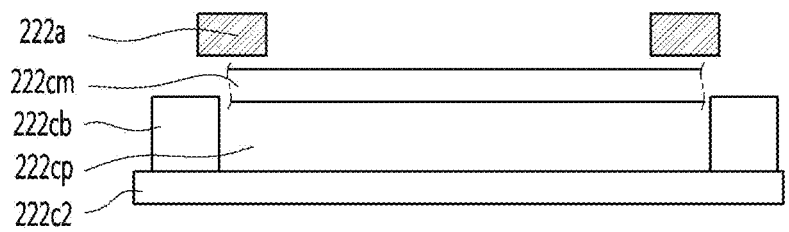
FIG. 6 is a cross-sectional view of the lens unit along the line A1-A1' of the shaper unit shown in FIG. 5.

Next, FIG. 6 is a cross-sectional view of the lens unit 222c along the line A1-A1' of the shaper unit 222 shown in FIG. 5.

Referring to FIG. 6, the lens unit 222c of the embodiment may include a light-transmitting support part 222c2, a bracket 222cb disposed on the light-transmitting support part 222c2 with a predetermined accommodation space, and a variable prism 222cp or a liquid lens (not shown) disposed in the accommodation space of the bracket 222cb. In addition, the lens unit 222c may include a flexible plate 222cm disposed on the variable prism 222cp or a liquid lens, and a second translucent support (not shown) disposed on the flexible plate 222cm.

The light-transmitting support part 222c2 and the second light-transmitting support part (not shown) may be formed of a light-transmitting material. For example, the light-transmitting support part 222c2 and the second light-transmitting support part may be formed of glass, but are not limited thereto.

The light-transmitting support portion 222c2 and the second light-transmitting support portion may have a hollow circular ring shape or a rectangular ring shape.

The size of the second light-transmitting support (not shown) may be formed to be smaller than the size of the accommodation space of the bracket 222cb.

The variable prism 222cp may include an optical liquid disposed in a space formed by the light-transmitting support part 222c2, the support bracket 222cb, and the flexible plate 222cm. Alternatively, the variable prism 222cp may include a wedge prism.

The optical liquid employed by the variable prism 222cp of the embodiment may be a material that is transparent, has low fluorescence, and is not toxic. For example, the optical liquid of the embodiment may employ a chlorofluorocarbon (CFC) component, but is not limited thereto.

The bracket 222cb may be formed of an elastic material or a non-stretchable material. For example, the bracket 222cb may be made of an elastic film or a metal material, but is not limited thereto.

The flexible plate 222cm may receive a predetermined force by the shaper body 222a according to the movement of the first driving part 72M. When receiving force, a part of the flexible plate 222cm may move upward or downward due to the characteristic of a flexible elastic material as shown in FIG. 7B, and the shape of the variable prism 222cp may be variable.

For example, the flexible plate 222cm may be a reverse osmosis (RO) membrane, a nano filtration (NF) membrane, an ultra-filtration (UF) membrane, a micro filtration (MF) membrane, etc., but is not limited thereto. Here, the RO membrane is a membrane having a pore size of about 1 to 15 angstroms, the NF membrane is a membrane having a pore size of about 10 angstroms, and the UF membrane is a membrane having a pore size of about 15 to 200 angstroms. The MF membrane may be a membrane having a pore size of about 200 to 1000 angstroms.

According to an embodiment, a lens unit including an image shaking control unit 220 stably disposed on the housing 210 and including a shaper unit 222 and a first driving part 72M and a variable prism 222cp. So, when implementing OIS through 222c, there is a technical effect that can produce the best optical characteristics by minimizing the occurrence of decent or tilt.

Next, FIGS. 7A to 7B are exemplary views of the operation of the first camera actuator 100 according to the embodiment.

For example, FIG. 7A is an exemplary view before the operation of the OIS actuator of the embodiment, and FIG. 7B is an exemplary view after the operation of the OIS actuator of the embodiment.

In a broad meaning, the prism of the embodiment may include a fixed prism 232 that changes the path of a predetermined light beam, and a variable prism 222cp that is disposed below the fixed prism 232 and changes the path of light rays emitted from the fixed prism 232.

Referring to FIGS. 7A and 7B, the second camera actuator 200 of the embodiment may control the optical movement path by changing the shape of the variable prism 222cp through the first driving part 72M and the second driving part 72C.

For example, in the embodiment, the second camera actuator 200 may control the path of the light beam by changing the vertex angle Θ of the variable prism 222cp through the first driving part 72M, which is a magnet driving part.

For example, referring to FIG. 7A, the incident light ray L1 can be changed to the second movement path L1a by the fixed prism 232, but the optical path is not changed in the variable prism 222cp.

On the other hand, referring to FIG. 7B, the second movement path L1a of the light beam changed by the fixed prism 232 may be changed in the variable prism 222cp to be changed to the third movement path L1b.

For example, when the flexible plate 222cm receives a predetermined force by the shaper body 222a according to the movement of the first driving part 72M, the second light-transmitting support unit (not shown) receives the force, and the force is transmitted to the flexible plate 222cm, and due to the characteristic of the flexible elastic material of the flexible plate 222cm, a part of the variable prism 222cp may move upward or downward, and the shape of the variable prism 222cp may be variable.

For example, the upper left of the shaper body 222a may receive a force F2 in the second direction by the first unit driving part 72M1 and the upper right of the shaper body 222a may receive a force F1 in the first direction by the second unit driving part 72M2 thereby shaper body 222a can be changed. As the shaper body 222a moves, the second light-transmitting support (not shown) receives a force, and by this force, the flexible plate 222cm may be changed to a slope of a predetermined angle Θ.

Hereinafter, with reference to FIG. 7B, an image shake prevention apparatus for controlling the path of light rays by changing the shape of the variable prism 222cp through the first driving part 72M will be described in more detail.

First of all, according to the embodiment, the image needs to be moved to the side by the first distance D1δ on the image plane 190P of the first lens assembly (not shown) provided in the first camera actuator 100 according to the occurrence of hand shake.

In this case, D1 is the distance from the variable prism 222cp to the image plane 190P of the first lens assembly, δ is the chromatic aberration of the variable prism 222cp, and Θ may be the vertex angle of the variable prism 222cp.

That is, according to the embodiment, after calculating the vertex angle Θ to be changed of the variable prism 222cp, the vertex angle Θ of the variable prism 222cp is changed through the first driving part 72M to determine the path of the light beam and the path of the light beam can be controlled as third path L1b.

At this time, between the chromatic aberration δ of the variable prism 222cp and the vertex angle Θ of the variable prism 222cp, a relationship of $\delta=(n-1)\times\Theta$ may be established (where n is a refractive index of the variable prism 222cp with respect to wavelength of the center of the band of interest).

According to the embodiment, since the prism unit 230 and the lens unit 222c including the variable prism can be arranged very close, even if the optical path change is fine in the lens unit 222c, there are special technical effects that the actual image sensor unit ca be secured a wide optical path change.

For example, in an embodiment, the fixed prism 232 and the lens unit 222c including the variable prism may be arranged very close. Accordingly, a distance between the lens unit 222c and the image plane 190P of the first lens assembly (not shown) can be secured relatively far. Accordingly, in the variable prism 222cp, the first distance D1δ reflected on the image plane 190P can be secured widely according to the change in the slope of the predetermined angle Θ. Therefore, even if the optical path change is finely performed in the lens unit 222c, there is a special technical effect of ensuring a wide range of optical path changes in the actual image sensor unit.

Figure 9A:
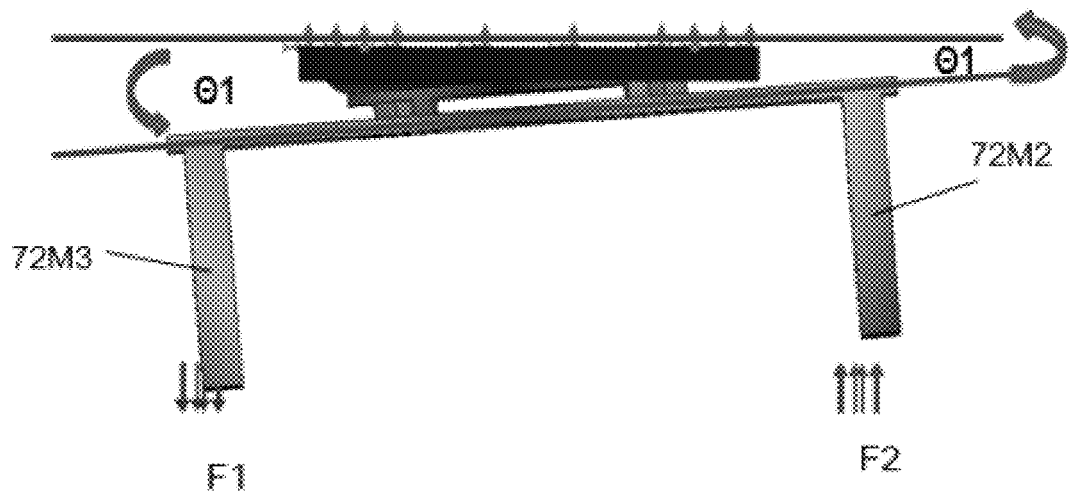
Figure 9B:
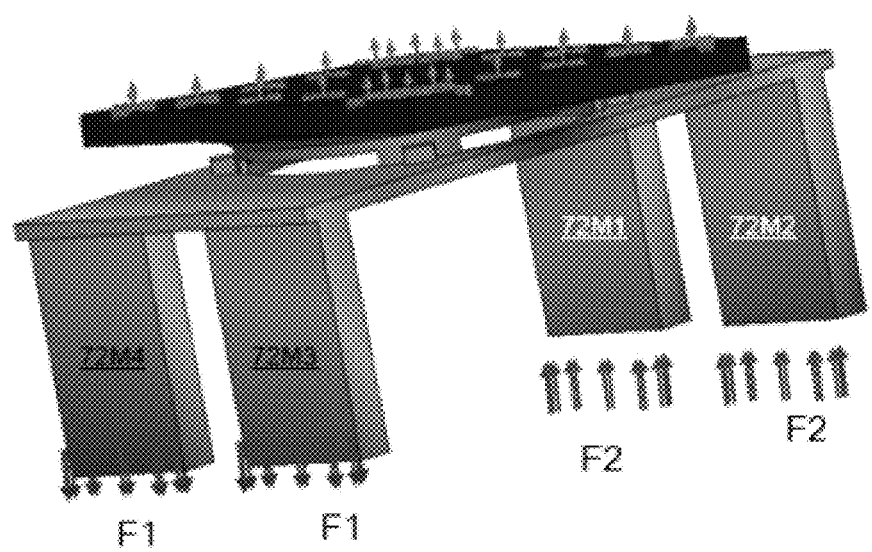

Next, FIGS. 8 to 9B are diagrams illustrating a first operation of the second camera actuator of the embodiment.

For example, FIG. 8 is a diagram illustrating a first operation as viewed from the z-axis direction in the second camera actuator 200 according to the embodiment illustrated in FIG. 2B.

In addition, FIG. 9A is a conceptual diagram in the y-axis direction of the first exemplary operation of the second camera actuator 200 of the embodiment shown in FIG. 8, and FIG. 9B is a conceptual perspective view of a first exemplary operation diagram of the second camera actuator 200 of the embodiment shown in FIG. 8.

Referring to FIG. 8, power is applied to the second driving part 72C through the second circuit board 250, and current flows through each coil. Accordingly, an electromagnetic force may be generated in the first direction (F1) or the second direction (F2) between the second driving part 72C and the first driving part 72M. And the flexible plate 222cm may be tilted at a predetermined angle by the moving first driving part 72M, and accordingly, the apex angle Θ of the variable prism 222cp may be controlled.

For example, referring to FIG. 8, the first unit driving part 72M1 and the second unit driving part 72M2 can be disposed so that a direction of magnetic force can be generated in the direction of the fifth unit driving part 72C1 and the sixth unit driving part 72C2. Also, the third unit driving part 72M3 and the fourth unit driving part 72M4 can be disposed so that a direction of magnetic force can be generated in the direction of the seventh unit driving part 72C3 and the eighth unit driving part 72C4.

In this case, when the current C1 in the first direction flows from the fifth unit driver 72C1 and the sixth unit driver 72C2, a force F2 may be applied in the second direction. Meanwhile, when the current C1 in the first direction flows in the seventh unit driver 72C3 and the eighth unit driver 72C4, the force F1 may be applied in the first direction opposite to the second direction.

Accordingly, as shown in FIGS. 9A and 9B, a force F2 may be applied to the flexible plate 222cm in the second direction from the first unit driving part 72M1 and the second unit driving part 72M2. In addition, the force F1 may be applied in the first direction from the third unit driving part 72M3 and the fourth unit driving part 72M4. Through this, the apex angle Θ of the variable prism 222cp may be changed at the first angle Θ1 to change and control the path of the light.

Figure 10:
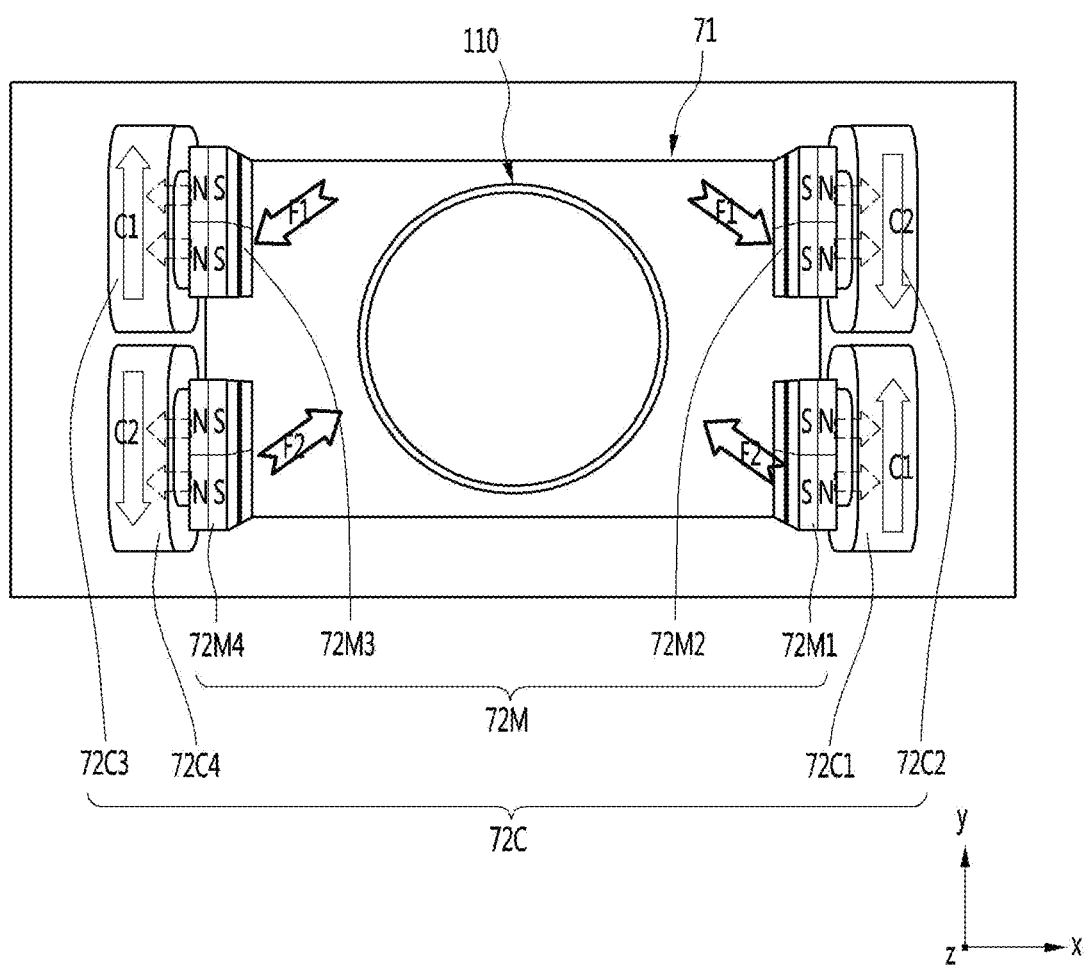
FIGS. 10 to 11B are diagrams illustrating a second operation of the second camera actuator of the embodiment.
Figure 11A:
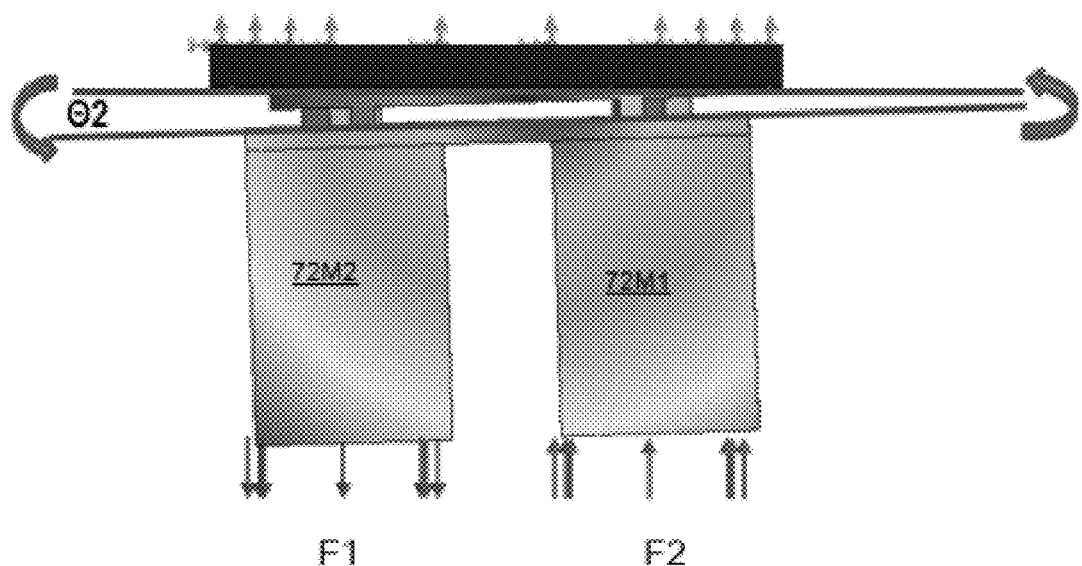
Figure 11B:
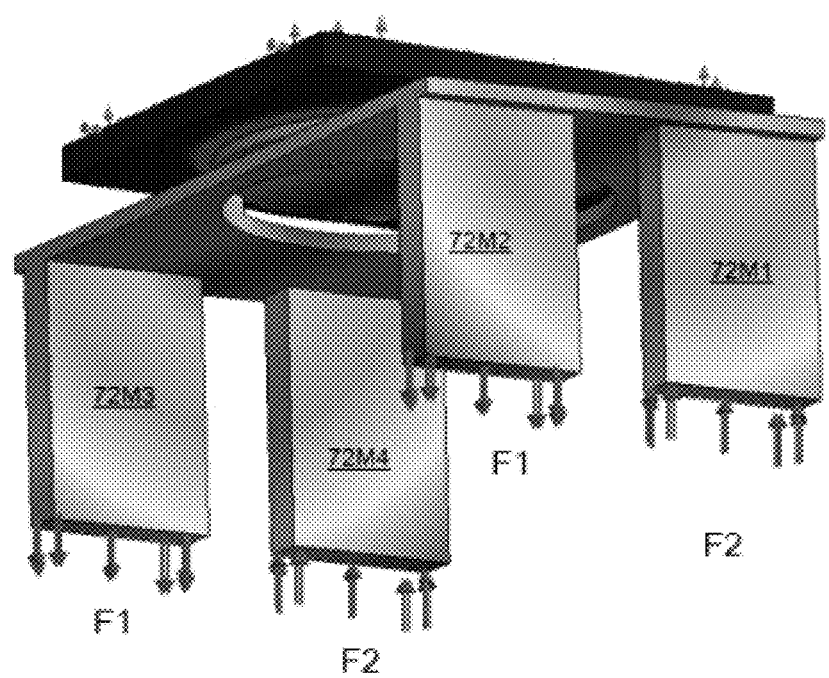

Next, FIGS. 10 to 11B are diagrams illustrating a second operation of the second camera actuator 200 of the embodiment.

For example, FIG. 10 is an exemplary view of a second operation viewed from the z-axis direction of the second camera actuator 200 according to the embodiment shown in FIG. 2B.

In addition, FIG. 11A is a conceptual diagram in the x-axis direction of a second exemplary operation of the second camera actuator 200 of the embodiment shown in FIG. 10, and FIG. 11B is a conceptual diagram of a conceptual perspective view of a second exemplary operation of the second camera actuator 200 of the embodiment shown in FIG. 10.

For example, power can be applied to the second driving part 72C so that current flows through each coil, and accordingly, an electromagnetic force between the second driving part 72C and the first driving part 72M is applied in the first direction F1 or the second direction Fe, such that the flexible plate 222cm may be tilted at a predetermined angle.

For example, referring to FIG. 10, the first unit driving part 72M1 and the second unit driving part 72M2 are configured to generate magnetic force in the direction of the fifth unit driving part 72C1 and the sixth unit driving part 72C2. The third unit driving part 72M3 and the fourth unit driving part 72M4 may be disposed so that a direction of magnetic force can be generated in the direction of the seventh unit driving part 72C3 and the eighth unit driving part 72C4.

At this time, the current C1 in the first direction flows through the fifth unit driving part 72C1 and the seventh unit driving part 72C3, and the current C2 in the second direction is applied to the sixth unit driving part 72C2 and the eighth unit driving part 72C4.

Accordingly, the force F2 may be applied in the second direction in the first unit driving part 72M1 and the fourth unit driving part 72M4, and the force F1 can be applied in the first direction in the second unit driving part 72M2 and the third unit driving part 72M3.

Accordingly, as shown in FIGS. 11A and 11B, a force F2 is applied in the second direction in the first unit driving part 72M1 and the fourth unit driving part 72M4 to the flexible plate 222cm of the variable prism 222cp. And a force F1 may be applied in the first direction in the second unit driving part 72M2 and the third unit driving part 72M3. Through this, the apex angle Θ of the variable prism 222cp can be changed to the second angle Θ2, so that the path of light can be changed and controlled. The drawing of FIG. 11A may correspond to FIG. 7B when rotated 180 degrees.

According to the embodiment, there is a technical effect of providing an ultra-slim, ultra-micro camera actuator and a camera module including the same by utilizing the space under the prism unit 230 and arranging the image shaking control unit 220 to overlap each other.

In addition, according to the embodiment, by disposing the image shaking control unit 220 under the prism unit 230, there is a technical effect of securing a sufficient amount of light by removing the size limitation of the lens in the lens assembly of the optical system when implementing OIS.

In addition, the embodiment may include an image shaking control unit 220 stably disposed on the housing 210. In addition, the OIS may be implemented through the lens unit 222c including the variable prism 222cp by the shaper unit 222 and the first driving unit 72M. Accordingly, there is a technical effect of minimizing the occurrence of decent or tilt when implementing OIS and of producing the best optical characteristics.

In addition, in the embodiment, when implementing the OIS, the first driving unit 72M, which is a magnet driving unit, may be disposed on the second camera actuator 200 separated from the first camera actuator 100. Accordingly, there is a technical effect of inhibiting magnetic field interference with the AF of the first camera actuator 100 or the magnet for zoom.

Figure 12:
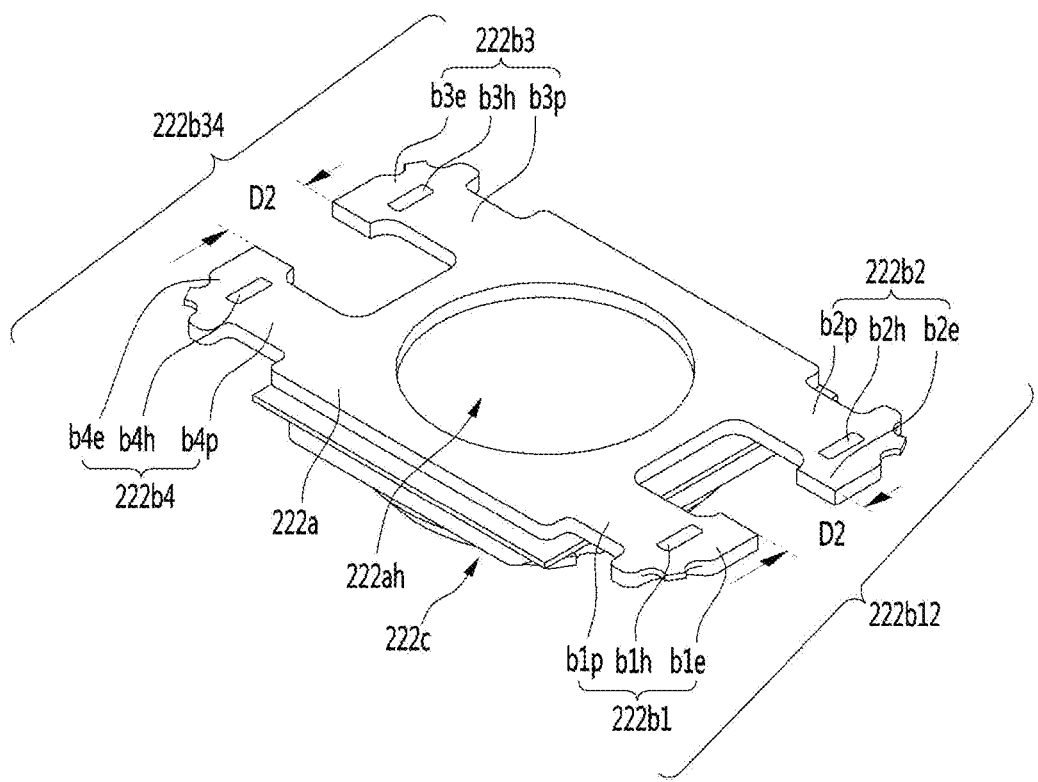
FIG. 12 is a perspective view of a first shaper unit of a second camera actuator of the embodiment.

Next, FIG. 12 is a detailed perspective view of the first shaper unit 222A of the second camera actuator 200 of the embodiment.

Referring to FIG. 12, the first shaper unit 222A includes a shaper body 222a including an opening 222ah through which light can pass, and a protruding region extending laterally from the shaper body 222a.

For example, the first shaper unit 222A may include a first side surface and a second side surface corresponding to the first side surface disposed on the lens unit 222c, a first protruding region b12 protruding from the first side surface of the shaper body 222a, and a second protruding region b34 protruding from the second side surface of the shaper body 222a.

The first protruding region b12 includes a first protrusion 222b1 protruding from one surface of the first side and a second protrusion 222b2 protruding from the other surface of the first side and spaced apart from the first protrusion 222b1.

The second protruding region b34 includes a third protrusion 222b3 protruding from one surface of the second side and a fourth protrusion 222b4 protruding from the other surface of the second side and spaced apart from the third protrusion 222b3.

In this case, the first protrusion 222b1 may include a first extension part b1p extending from the shaper body 222a to a first side and a first support part b1e. In addition, the first protrusion 222b1 may include a first coupling groove bh1 disposed on the first support b1e.

In addition, the second protrusion 222b2 has a second extension part b2p branching and extending from the first extension part b1p to the first side from the shaper body 222a, a second support part b2e. Also, the second protrusion 222b2 may include a second coupling groove b2h disposed on the second support part b2e.

The first, second unit driving parts 72M1 and 72M2 may be coupled to the first coupling groove 222bh1 and the second coupling groove b2h.

In addition, the third protrusion 222b3 may include a third extension part b3p extending from the shaper body 222a to the second side, a third support part b3e, and a third coupling groove b3h disposed on the third support part b3e.

In addition, the fourth protrusion 222b4 may include a fourth extension part b4p extending from the shaper body 222a by branching from the third extension part b3p, a fourth support part b4e, and a fourth coupling groove b4h disposed on the fourth support b4e.

Third, fourth unit driving parts 72M3 and 72M4 may be coupled to the third coupling groove b3h and the fourth coupling groove b4h.

At this time, referring to FIG. 12, in an embodiment, a first support part b1e that is an end of the first protrusion 222b1 and a second support part b2e that is an end of the second protrusion 222b2 are separated from each other and can be spaced apart at a second distance D2.

In addition, referring to FIG. 12, in an embodiment, a third support part b3e which is an end of the third protrusion 222b3 and a fourth support part b4e which is an end of the fourth protrusion 222b4 are separated from each other can be spaced apart at a second distance D2.

Figure 13:
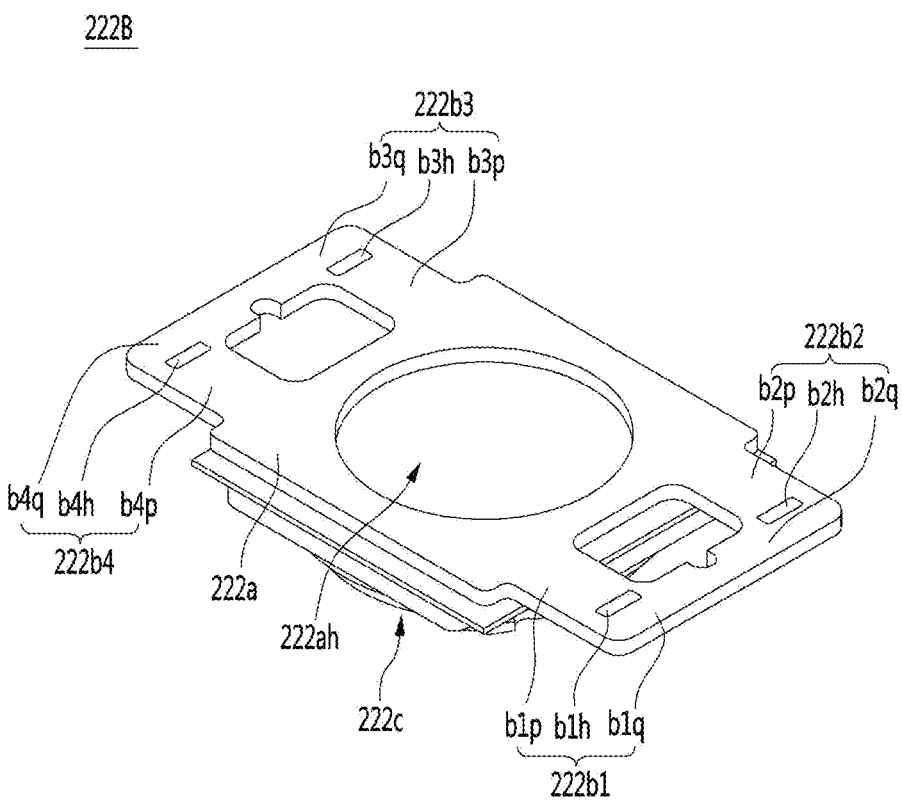
FIG. 13 is a perspective view of a second shaper unit of the second camera actuator of the embodiment.

Meanwhile, FIG. 13 is a perspective view of the second shaper unit 222B of the second camera actuator 200 of the embodiment.

Referring to FIG. 13, in an embodiment, the second shaper unit 222B may include a plurality of magnet support portions respectively extending from the shaper body 222a to both sides. For example, the second shaper unit 222 includes a first protrusion 222b1, a second protrusion 222b2 branching from the shaper body 222a extended to a first side and a third protrusion 222b3, a fourth protrusion 222b4 branching from the shaper body 222a extended to a second side.

In addition, the first protrusion 222b1 may include a first extension part b1p and a first-second support part b1q branching and extending from the shaper body 222a to the first side, and include a first coupling groove bh1 disposed on the first-second support part b1q.

In addition, the second protrusion 222b2 may include a second extension part b2p and second-second support part b2q branching and extending from the shaper body 222a to a first side, and a second coupling groove b2h disposed on the second-second support b2q.

In addition, the third protrusion 222b3 may include a third extension part b3p and a third-second support part b3q branching and extending from the shaper body 222a to the second side, and a third coupling groove b3h disposed on the third-second support part b3q.

In addition, the fourth protrusion 222b4 may include a fourth extension part b4p and a fourth-second support part b4q branching an extending from the shaper body 222a to a second side, and a fourth coupling groove b4h disposed on the fourth-second support part b4q.

At this time, referring to FIG. 13, in an embodiment, the first-second support part b1q which is the end of the first protrusion 222b1 and the second-second support part b2q which is the end of the second protrusion 222b2 can be connected to each other.

In addition, referring to FIG. 13, in an embodiment, the third-second support part b3q which is an end of the third protrusion 222b3 and the fourth-second support part b4q which is an end of the fourth protrusion 222b4 can be connected to each other.

Figure 14:
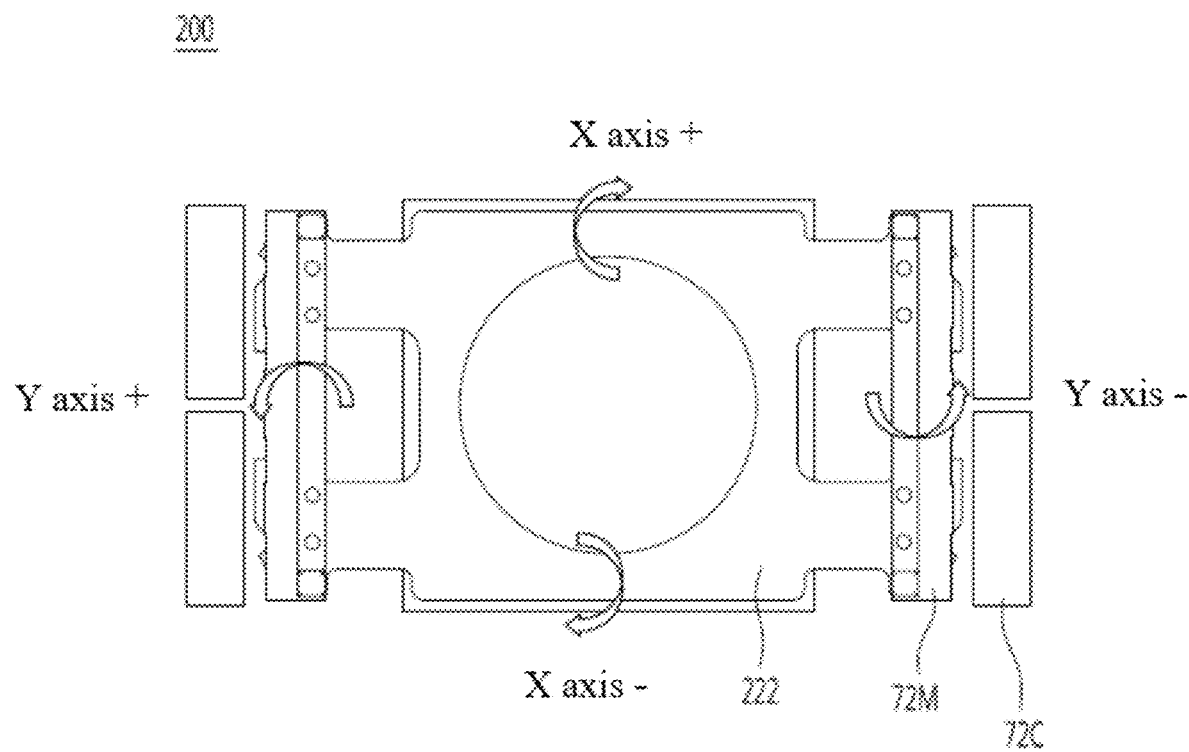
FIG. 14 is a diagram illustrating a third operation of the second camera actuator according to the embodiment.

FIG. 14 is an exemplary view illustrating the operation of the second camera actuator 200 according to the embodiment, and the x-axis direction and y-axis direction in FIG. 14 may be the same as or different from the previously illustrated directions.

Referring to FIG. 14, when power is applied to the second driving part 72C and current flows through each coil, an electromagnetic force between the second driving part 72C and the first driving part 72M is applied in the first direction or the second direction. The flexible plate 222cm may be tilted at a predetermined angle by the first driving part 72M moved by the electromagnetic force, so that the vertex angle Θ of the variable prism 222cp may be controlled.

Figure 15A:
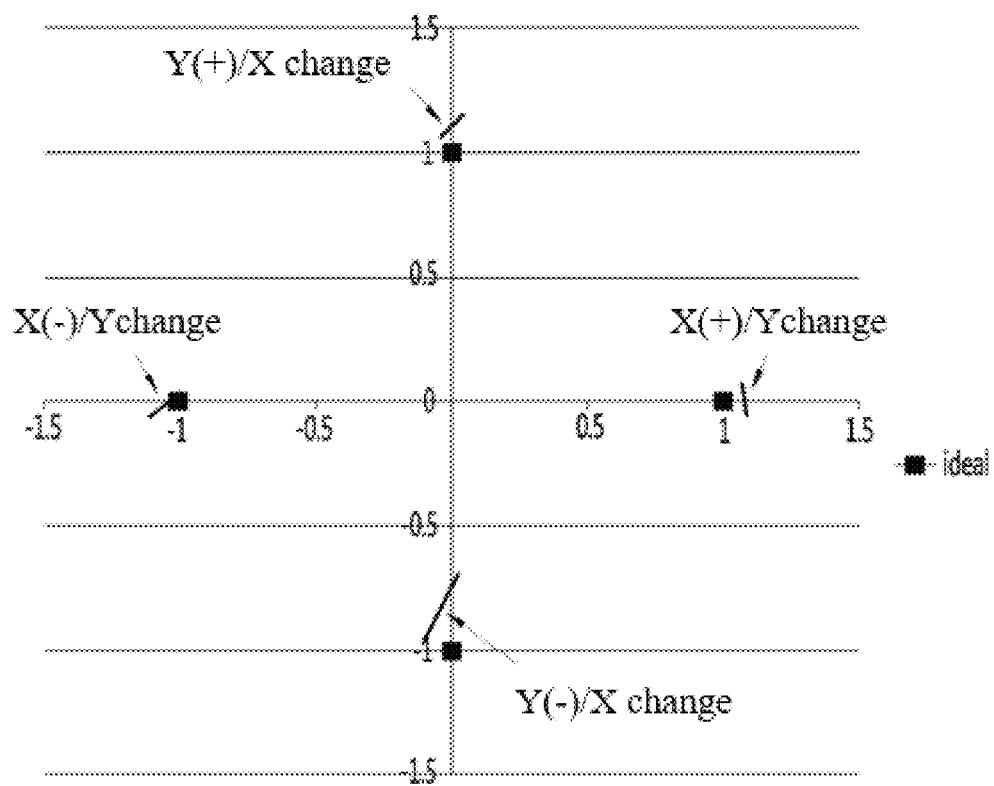
FIG. 15A is a variation characteristic of a second shaper unit of a second camera actuator according to an embodiment.
Figure 15B:
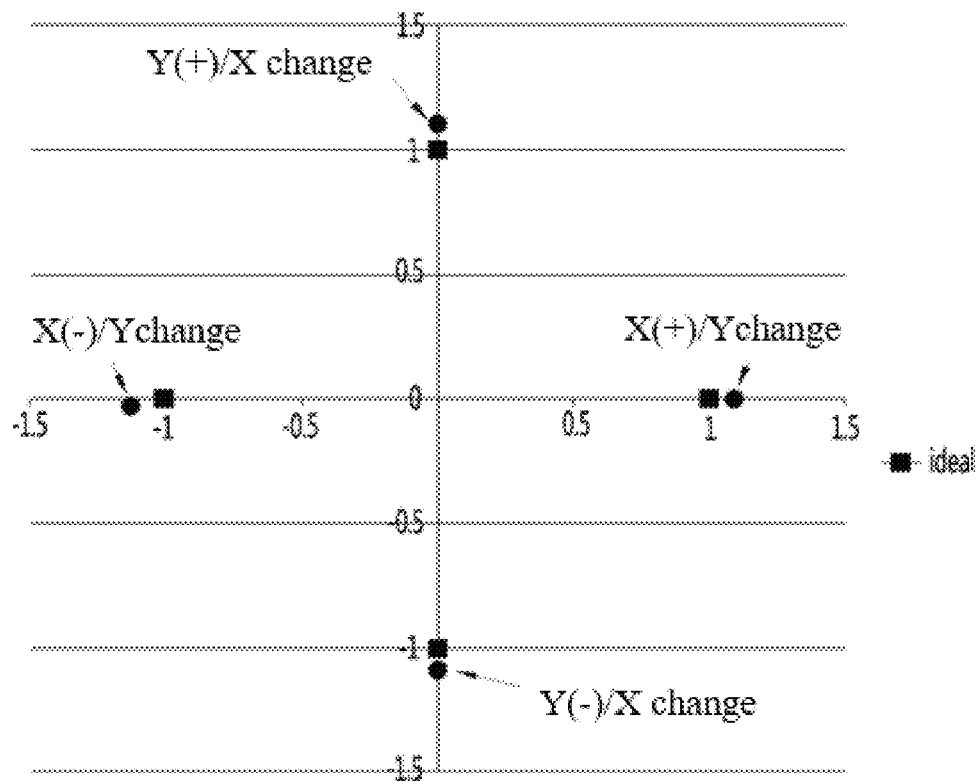
FIG. 15B is a variation characteristic of a first shaper unit of a second camera actuator according to an embodiment.

In this case, FIG. 15A is a characteristic of the implementation when the second shaper unit 222B of the second camera actuator 200 according to the embodiment is implemented, and FIG. 15B is a characteristic of the implementation when the first shaper unit 222A of the second camera actuator 200 according to the embodiment is implemented.

According to an undisclosed internal experiment using the second shaper unit 222B in the embodiment, as shown in FIG. 15A, when the first-second support part b1q and the second-second support part b2q are connected to each other, and the third-second support part b3q and the fourth-second support part b4q are connected to each other, the amount of change occurs in an error range compared to the target value (ideal) during each axial driving.

On the other hand, according to an undisclosed experiment using the first shaper unit 222A in the embodiment, as shown in FIG. 15B, when the first support part b1e and the second support part b2e are spaced apart from each other by a second separation distance D2 and the third support part b3e and the fourth support part b4e are separated by a second separation distance (D2) from each other, the amount of change is significantly reduced compared to the target value (ideal) when driving in each axial direction, resulting in a remarkable performance improvement effect.

That is, in the embodiment, when the first protrusion 222b1 and the second protrusion 222b2 are spaced apart, and the third protrusion 222b3 and the fourth protrusion 222b4 are spaced apart from each other, the x-axis or y, there is a special technical effect in that performance is improved by remarkably reducing the amount of error change generated compared to the target value (ideal) when driving in each axial direction because it may less affect other protrusions when moving the axis.

Figure 16A:
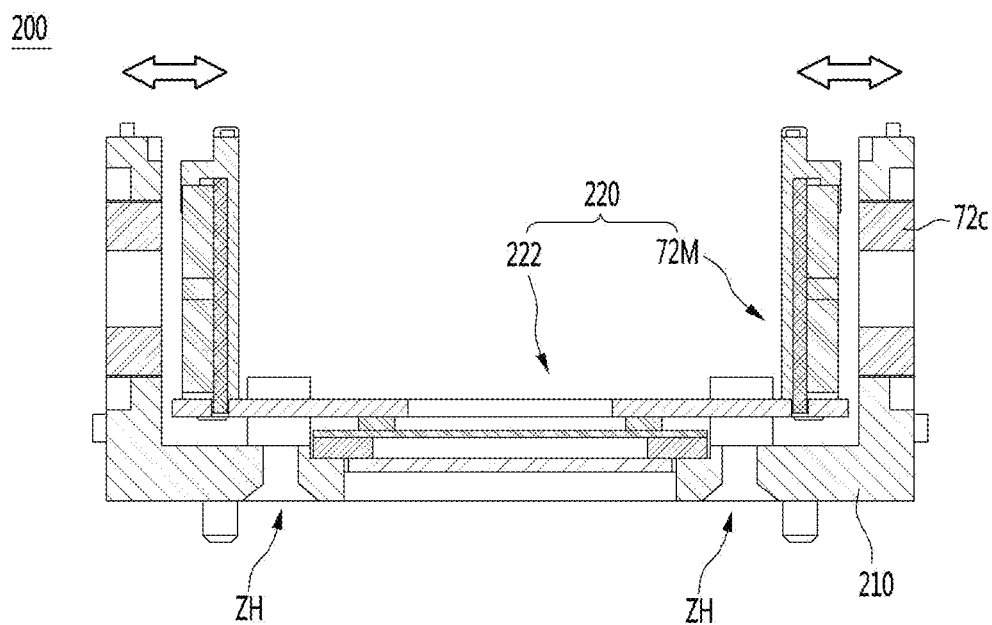
FIG. 16A is a first cross-sectional view of a second camera actuator according to an embodiment.
Figure 16B:
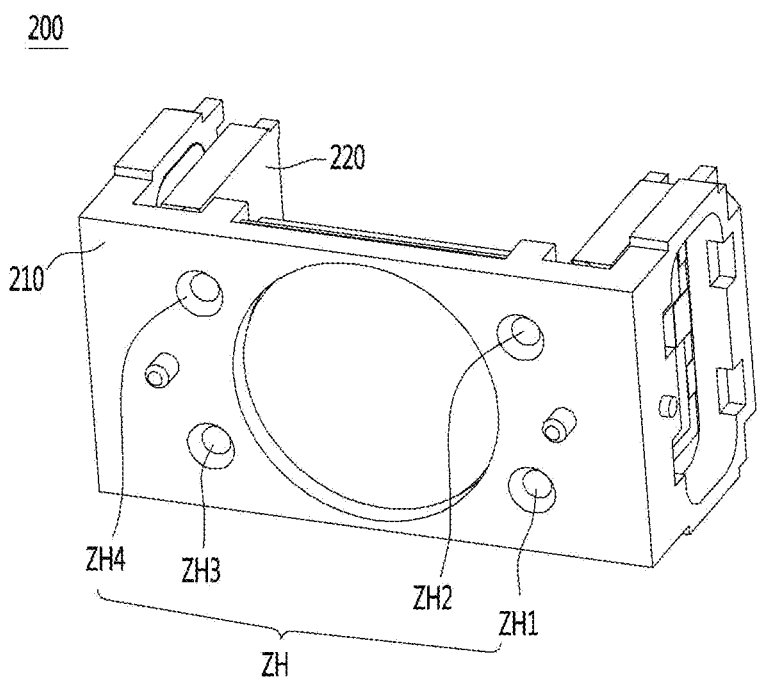
FIG. 16B is a bottom view of a second camera actuator according to the embodiment.

Next, FIG. 16A is a first cross-sectional view of the second camera actuator 200 according to the embodiment, and FIG. 16B is a bottom perspective view of the second camera actuator 200 according to the embodiment.

Referring to FIGS. 16A and 16B, the second camera actuator 200 of the embodiment may include a housing 210, a shaper unit 222, an image shake control unit 220 disposed on the housing 210 including a first driving part 72M, a second driving part 72C disposed on the housing 210, and a third prism unit 230 (see FIG. 3B) disposed on the image shaking control unit 220.

According to the closed internal technology, it has been studied that if the shaper unit 222 is not firmly supported on the housing 210, there is a technical problem in that a tilt occurs in the lens unit 222c or the prism unit 230.

Accordingly, in the embodiment, a jig hole ZH may be provided in the housing 210, and a predetermined jig (not shown) can be firmly attached to the jig hole ZH of the housing 210 during the assembly process of the second camera actuator 200.

The jig hole ZH may be provided in plurality, and may include first, second, third, and fourth jig holes ZH1, ZH2, ZH3, and ZH4. The jig may also include first, second, third, and fourth jigs.

For example, the housing 210 may include first to fourth jig holes ZH1, ZH2, ZH3, ZH4 which are formed to overlap the first to fourth protrusions 222b1, 222b2, 222b3, 222b4 of the shaper body in a vertical direction.

The housing 210 may include an opening 212H formed between the first to fourth jig holes ZH1, ZH2, ZH3, and ZH4 through which light can pass.

At this time, the jig may pass through the jig hole ZH and be led out to the upper side of the housing 210, and the shaper unit 222 may be firmly disposed on the protruding jig.

The first to fourth jigs may be disposed to vertically overlap the first to fourth protrusions 222b1, 222b2, 222b3, 222b4 of the shaper body.

Thereafter, the first driving part 72M, the second driving part 72C, and the like may be firmly coupled to the shaper unit 222, and there is a special technical effect that can significantly inhibit the occurrence of tilt.

According to the embodiment, there is a technical effect of providing an ultra-slim, ultra-micro camera actuator and a camera module including the same.

In addition, according to the embodiment, there is a technical effect of providing a camera actuator and a camera module including the same, capable of securing a sufficient amount of light by removing a size limitation of a lens in a lens assembly of an optical system when implementing OIS.

In addition, according to the embodiment, there is a technical effect of providing a camera actuator and a camera module including the same, capable of exhibiting the best optical characteristics by minimizing the occurrence of a decent or a tilt phenomenon when implementing OIS.

In addition, according to the embodiment, when implementing OIS, there is a technical effect of providing a camera actuator and a camera module including the same, capable of inhibiting magnetic field interference with a magnet for AF or zoom.

In addition, according to the embodiment, there is a technical effect of providing a camera actuator and a camera module including the same, capable of implementing OIS with low power consumption.

In addition, according to the embodiment, since the prism unit 230 and the lens unit 222c including the variable prism can be arranged very close, even if the optical path change is made fine in the lens unit 222c, there are special technical effects in that the optical path change can be widened in the actual image sensor unit.

Figure 17A:
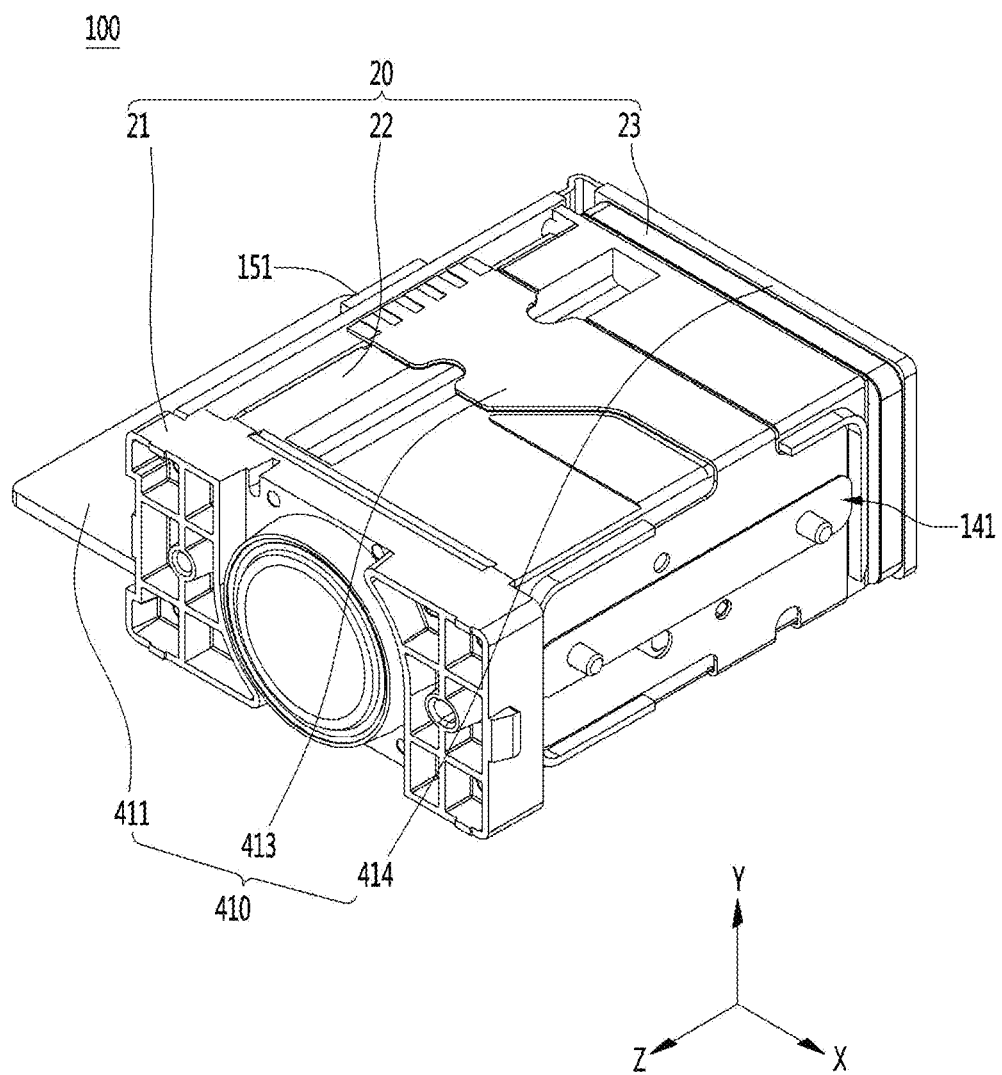
FIG. 17A is a detailed perspective view of the first camera actuator of the embodiment shown in FIG. 1.
Figure 17B:
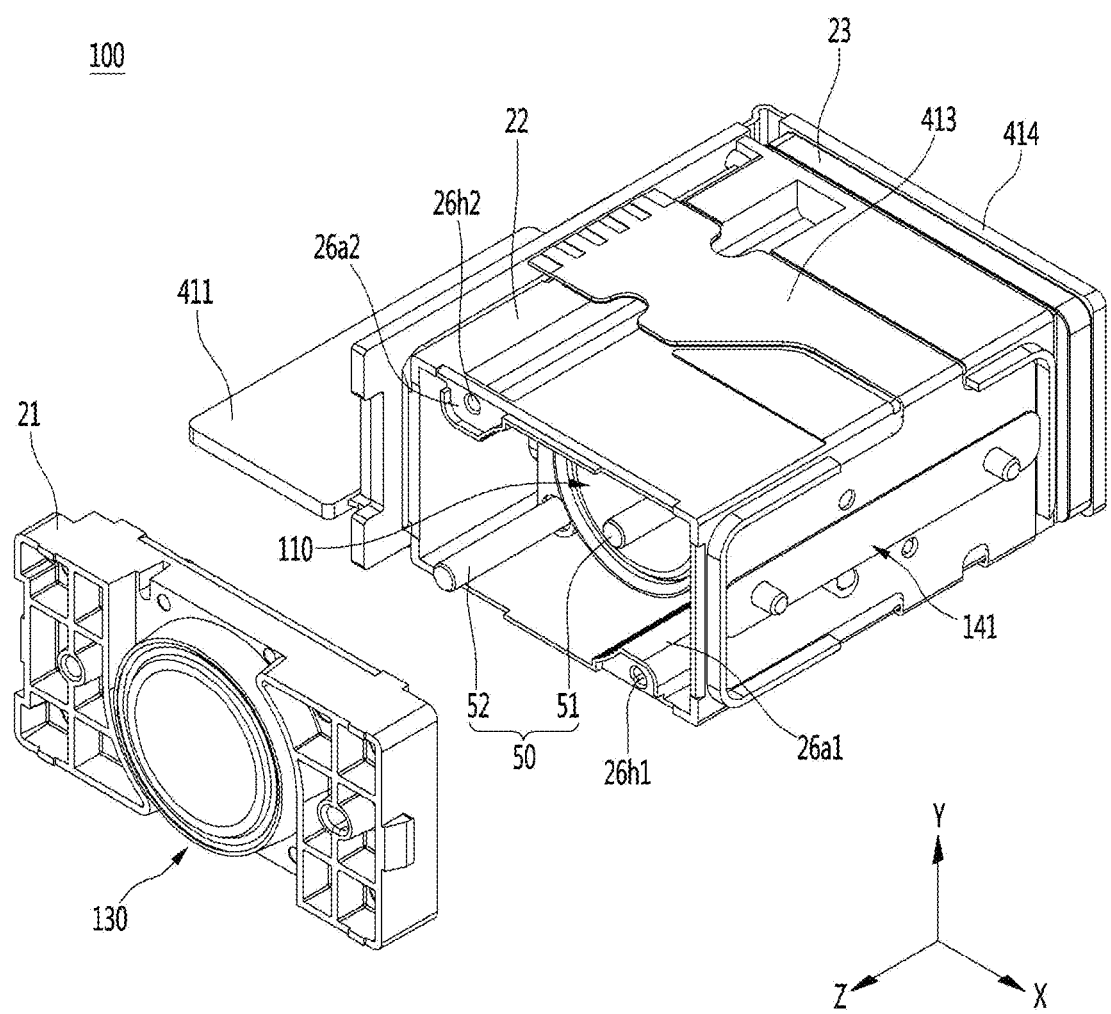
FIG. 17B is an exploded perspective view of the first camera actuator of the embodiment shown in FIG. 18A.

Next, FIG. 17A is a detailed perspective view of the first camera actuator 100 of the embodiment shown in FIG. 1, and FIG. 17B is an exploded perspective view of the first camera actuator 100 of the embodiment shown in FIG. 17A.

Figure 17C:
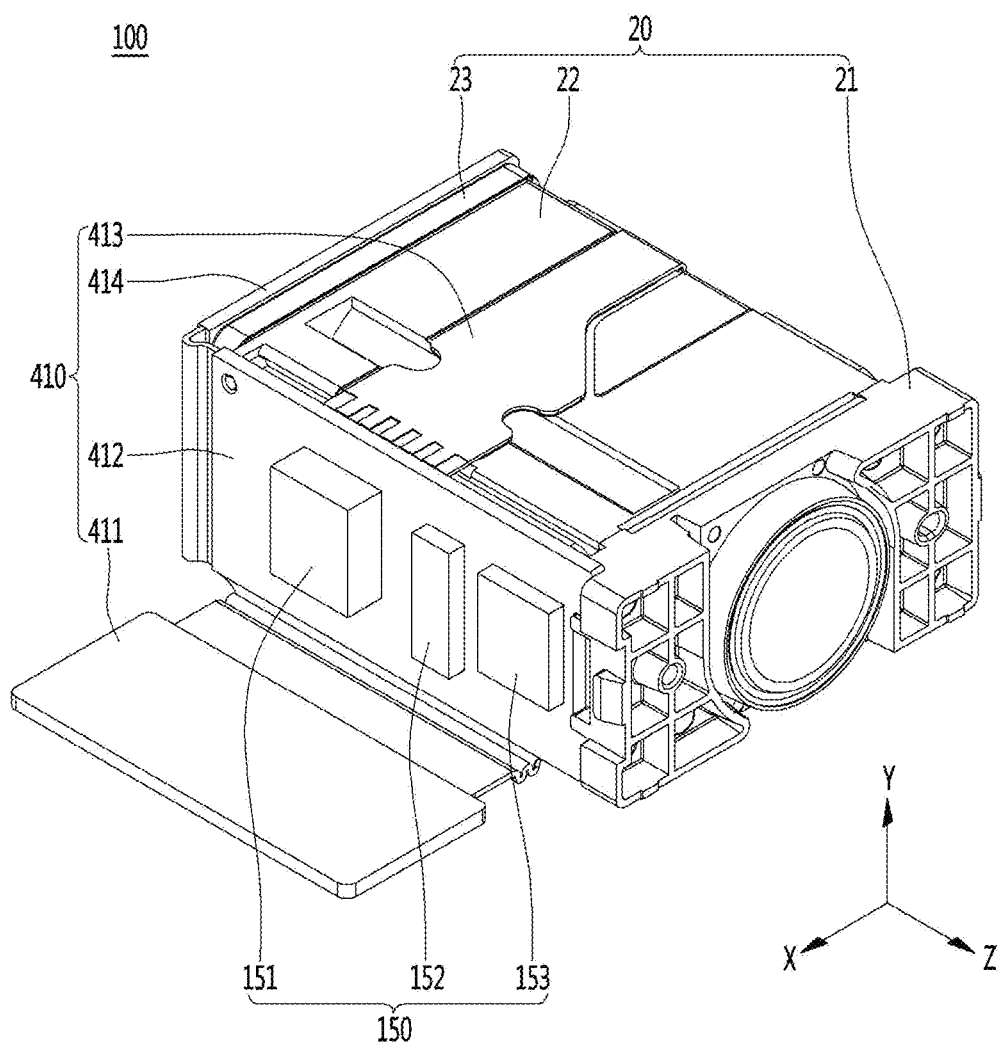
FIG. 17C is a perspective view from another direction of the first camera actuator of the embodiment shown in FIG. 17A.
Figure 17D:
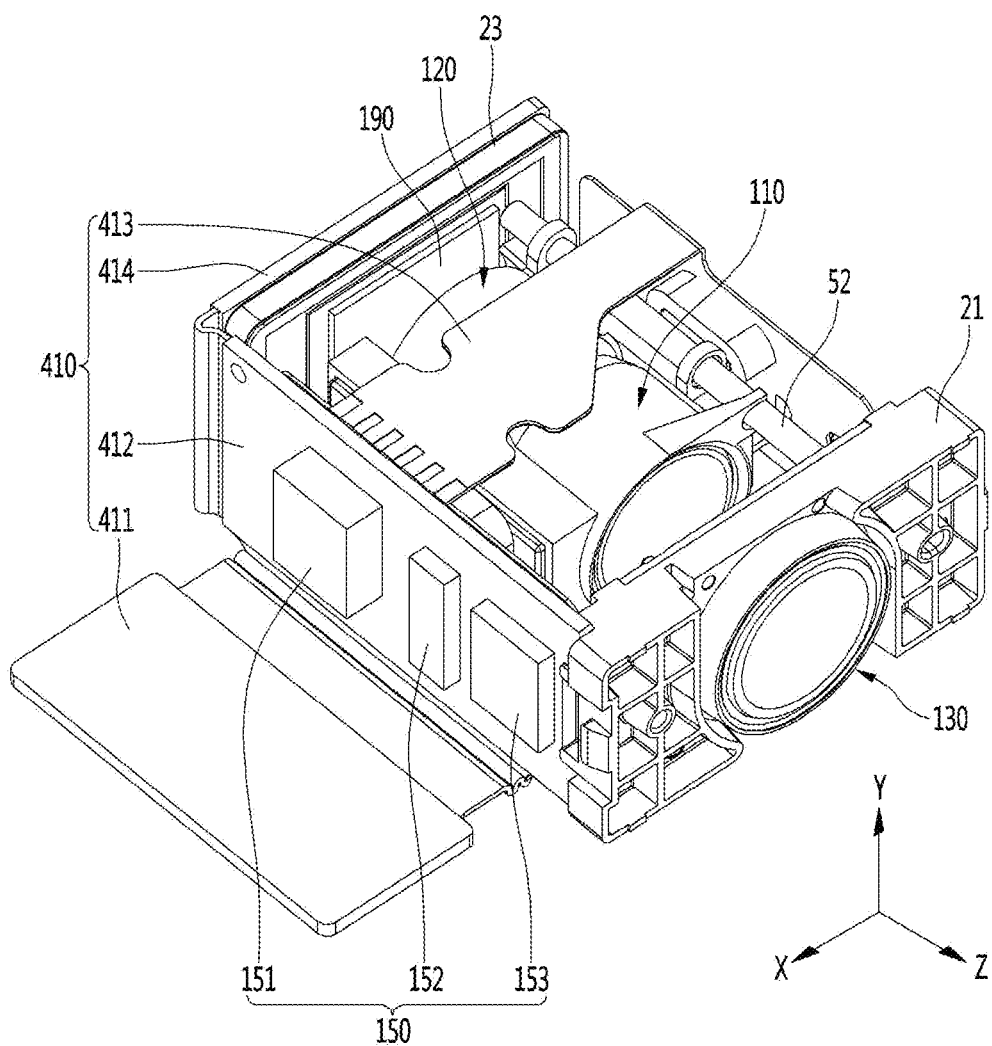
FIG. 17D is an exploded perspective view of the first camera actuator of the embodiment shown in FIG. 17C.

FIG. 17C is a perspective view of the first camera actuator 100 of the embodiment shown in FIG. 17A from another direction, and FIG. 17D is an exploded perspective view of the first camera actuator 100 of the embodiment shown in FIG. 17C.

Features of the first camera actuator 100 according to the embodiment will be described in detail with reference to the accompanying drawings.

FIG. 17A is a perspective view of the first camera actuator 100 in which the gyro sensor 151 is disposed on the rear surface, and FIG. 17C is a visible perspective view showing a front view of the device unit 150 including the gyro sensor 151 in the first camera actuator 100.

First, referring to FIGS. 17C and 17D, in the camera module of the embodiment, the first camera actuator 100 includes a base 20, a first group of circuit boards 410 and a device unit 150 disposed outside the base 20.

The base 20 may include a base body 22, a first cover 21 disposed on one side of the base body 22, and a second cover 22 disposed on the other side.

The material of the base 20 may be formed of at least one of plastic, glass-based epoxy, polycarbonate, metal, or composite material.

In the embodiment, the base 20 may be designed in a master barrel structure that surrounds the entire zoom module to inhibit foreign matter, block light, fix pins, and fix the lens, but is not limited thereto. The first cover 21 and the second cover 22 may be fitted in shape with the base body 22, or may be coupled by an adhesive.

The first group of circuit boards 410 may include single or multiple circuit boards. For example, the first group of circuit boards 410 may include a first circuit board 411, a second circuit board 412, a third circuit board 413 and a fourth circuit board 414.

The second circuit board 412 is electrically connected to the first circuit board 411, and a gyro sensor 151 for detecting motion, a first electronic device 152, and a second electronic device 153 are disposed thereon. The first electronic device 152 may be a driver IC, and the second electronic device 153 may be an EEPROM, but is not limited thereto.

The third circuit board 413 may be electrically connected to a driving part driving the lens unit, and an image sensor 190 may be disposed on the fourth circuit board 414.

Next, referring to FIG. 17D, various optical systems such as the first lens assembly 110, the second lens assembly 120, and the third lens group 130 are disposed on the base body 22, and are arranged in the direction of the optical axis. A first side of the base body 20 may be coupled to the first cover 21, and the other side may be coupled to the second cover 22. A predetermined image sensor unit 190 may be disposed in the direction of the second cover 22.

Referring back to FIG. 17B, in the embodiment, the first cover 21 and the second cover 22 may be coupled to the guide pin 50. For example, the guide pin 50 may include a first guide pin 51 and a second guide pin 52 disposed to be spaced apart in parallel to the optical axis. One end of the first guide pin 51 and the second guide pin 52 may be fixed by being coupled to the first cover 21 and the other end of the second cover 22.

The first cover 21 of the embodiment may include a first hook (not shown) and a second hook (not shown) protruding from the first cover body (not shown) in the direction of the base body 22. In addition, the first hook and the second hook may be disposed in a diagonal direction.

In addition, the base body 22 has a first hook coupling portion 26a1 and a second hook coupling portion 26a2 disposed at positions corresponding to the first hook and the second hook. And a first hole 26h1 and a second hole 26h2 may be disposed in each of the first hook coupling portion 26a1 and second hook coupling portions 26a2.

The first hook and the second hook of the first cover 21 may be coupled to the first hole 26h1 and the second hole 26h2 of the base body 22, respectively. In addition, the first cover 21 may be stably coupled to the base body 22 using an adhesive.

In addition, the first cover 21 includes a first pin coupling portion (not shown) and a second pin coupling portion (not shown) coupled to the first guide pin 51 and the second guide pin 52, respectively. The first guide pin 51 and the second guide pin 52 may be inserted and coupled, respectively.

In addition, a third lens group 130 may be disposed on the first cover 21. The third lens group 130 may be a fixed lens, but is not limited thereto.

A first lens assembly 110 and a second lens assembly 120 may be disposed inside the base body 22.

According to an embodiment, a bottom groove (not shown) in which the first lens assembly 110 and the second lens assembly 120 moves are formed parallel to the optical axis z direction on the bottom surface of the base body 22. The bottom groove may have a shape that is concave downward according to the outer peripheral shape of the lens, but is not limited thereto.

With continued reference to FIG. 17B, in an embodiment, a third driving part 141 and a fourth driving part 142 (see FIG. 18A) may be disposed on both sides of the body 20 of the base.

Figure 18A:
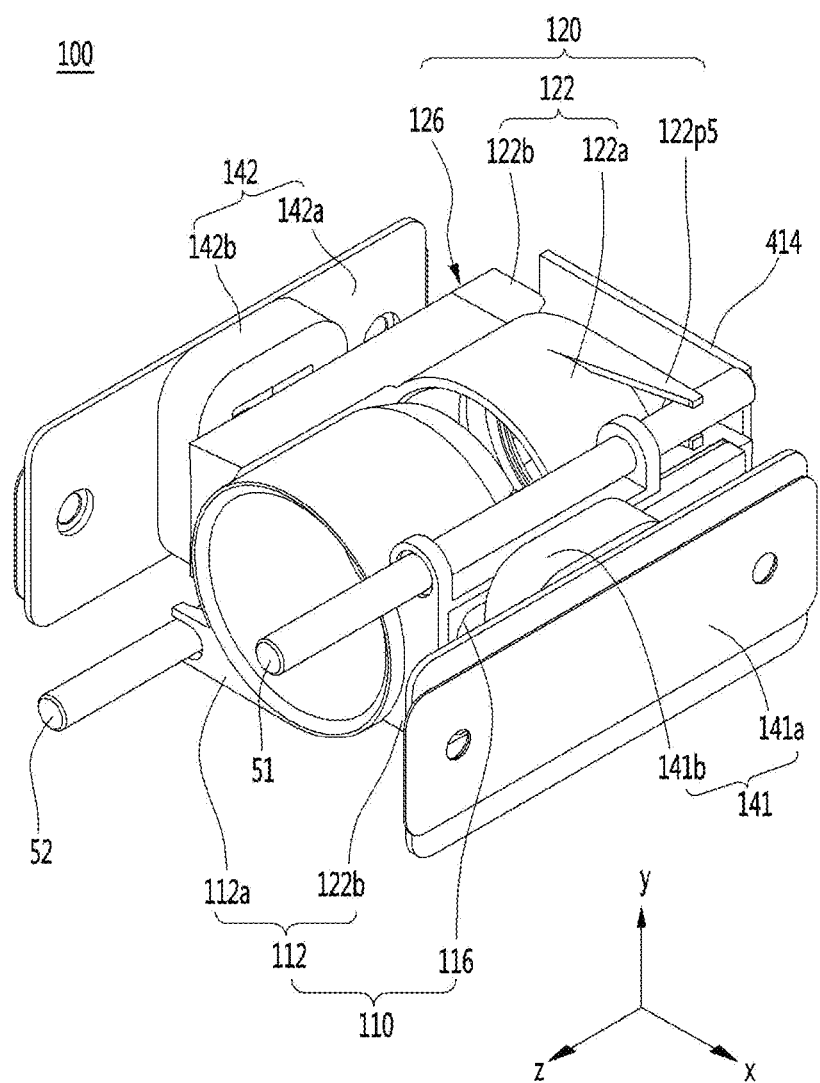
FIG. 18A is a perspective view in which the base body, the first cover, and the second cover are removed from the first camera actuator in the embodiment shown in FIG. 17A.

Next, FIG. 18A is a perspective view in which the base body 22, the first cover 21, and the second cover 22 are removed from the first camera actuator 100 in the embodiment shown in FIG. 17B, and the lens itself is omitted in the FIG. 17B.

Referring to FIGS. 18A and 17B together, an optical system and a lens driver may be disposed on the base body 22 of the first camera actuator 100 in the embodiment. For example, in the embodiment, the first camera actuator 100 includes at least one or more of a first lens assembly 110, a second lens assembly 120, a third lens group 130, or a guide pin 50 disposed on the base body 22. The third driving part 141 and the fourth driving part 142 may be disposed outside the base body 22, thereby performing a high magnification zooming function.

Meanwhile, the first lens assembly 110, the second lens assembly 120, the third lens group 130, the image sensor unit, and the like may be classified as an optical system.

Also, the third driving part 141, the fourth driving part 142, and the guide pin 50 may be classified as a lens driving part, and the first lens assembly 110 and the second lens assembly 120 also function as a lens driving part. The third driving part 141 and the fourth driving part 142 may be driving parts including a coil and a yoke, but are not limited thereto.

Referring to FIG. 18A, the guide pin 50 may perform a guide function of a lens assembly to be moved, and may be provided in a single number or in a plurality. For example, the guide pin 50 may include a first guide pin 51 and a second guide pin 52, but is not limited thereto. The guide pin 50 may be referred to as a rod or a shaft, but is not limited thereto.

In an embodiment, a predetermined prism unit may be disposed on the side of the third lens group 130, and a predetermined image sensor unit 190 may be disposed on the side of the second cover 22. The prism unit may also be included in the optical system.

In an embodiment, the prism unit may change incident light into parallel light. For example, the prism unit may change the incident light into parallel light by changing the optical path of the incident light to an optical axis (z-axis) parallel to the central axis of the lens group. Thereafter, the parallel light passes through the third lens group 130, the first lens assembly 110, and the second lens assembly 120, and enters the image sensor unit 190 to capture an image.

The prism unit may include the lens unit 222*c* and the prism unit 230 described above, but is not limited thereto. In addition, in the embodiment, when the image sensor unit 190 is not disposed in a direction perpendicular to the optical axis, an additional prism (not shown) may be provided so that light that has passed through the lens group is captured by the image sensor unit.

In an embodiment, the image sensor unit 190 may be disposed perpendicular to the optical axis direction of parallel light. The image sensor unit may include a solid-state imaging device disposed on a predetermined fourth circuit board 414. For example, the image sensor unit 190 may include a Charge Coupled Device (CCD) image sensor or a Complementary Metal-Oxide-Semiconductor (CMOS) image sensor.

In the following description of the embodiment, a case of two moving lens groups is described, but the number of moving lens groups is not limited thereto, and there may be three, four, or five or more moving lens groups. In addition, the optical axis direction z may mean a direction identical to or parallel to the direction in which the lens groups are aligned.

With continued reference to FIG. 18A, the first camera actuator 100 according to the embodiment may perform a zooming function. For example, in the embodiment, the first lens assembly 110 and the second lens assembly 120 are moving lenses that move by the third driving part 141, the fourth driving part 142 and the guide pin 50. And the third lens group 130 may be a fixed lens, but is not limited thereto (see FIG. 17B).

In this case, the third lens group 130 may perform a function of a focator for forming parallel light at a specific position.

Next, the first lens assembly 110 may perform a variable function of re-forming an image formed by the third lens group 130 as a condenser to another location. On the other hand, in the first lens assembly 110, the magnification change may be large due to the large change in the distance or the image distance to the subject, and the first lens assembly 110 as a variable factor plays an important role in the change in the focal length or magnification of the optical system.

On the other hand, the image of the image in the first lens assembly 110, which is a variable factor, may be slightly different depending on the location.

Accordingly, the second lens assembly 120 may perform a position compensation function for an image formed by the variable power. For example, the second lens assembly 120 may perform a function of a compensator that performs a role of accurately imaging a store imaged by the first lens assembly 110, which is a variable factor, at an actual image sensor position.

In an embodiment, the actuator may include a mover and a fixing part. The mover is a concept corresponding to a fixed part and may be referred to as a moving part. For example, the mover may mean the first and second lens assemblies 110 and 120 that are moved through the guide pin 50. On the other hand, the fixing part may mean a base 20, a guide pin 50, a third driving part 141, a fourth driving part 142, and the like that are not moved.

With continued reference to FIG. 18A, in an embodiment, one or more guide pins 50 may be disposed parallel to the optical axis (z-axis). For example, the guide pin 50 may include a first guide pin 51 and a second guide pin 52 spaced apart from each other in parallel to the optical axis direction. The first guide pin 51 and the second guide pin 52 are coupled to the first cover 21 and the second cover 22 of the base, so that the first guide pin 51 and the second guide pin 52 can function as a movement guide for the first lens assembly 110 and the second lens assembly 120. The guide pin 50 may be formed of at least one of plastic, glass-based epoxy, polycarbonate, metal, or composite material, but is not limited thereto.

Next, in the embodiment, the first lens assembly 110 and the second lens assembly 120 may be driven by electromagnetic force due to interaction with the third driving part 141 and the fourth driving part 142, respectively, but is not limited thereto.

The third driving part 141 and the fourth driving part 142 may be driving parts having a coil and a yoke. For example, the third driving part 141 may include a first yoke 141a and a first coil unit 141b, and the fourth driving part 142 may include a second yoke 142a and a second coil unit 142b.

In addition, the first lens assembly 110 of the embodiment may include at least one of the first housing 112, the first lens group (not shown), and the first magnet 116. The first housing 112 may include a first lens housing 112a accommodating a first lens group (not shown) and a first driving part housing 112b accommodating the first magnet 116. The lens housing may be referred to as a lens barrel, but is not limited thereto.

In addition, the first housing 112 may further include a first-second yoke (not shown) under the first magnet 116 inside the first driving unit housing 112b. Accordingly, it is possible to block the magnetic force of the first magnet 116 from affecting the inside of the base body 22 by the first-second yoke.

In addition, the second lens assembly 120 of the embodiment may include at least one of the second housing 122, the second lens group (not shown), and the second magnet 126. The second housing 122 may include a second lens housing 122a accommodating a second lens group (not shown) and a second driving part housing 122b accommodating the second magnet 126. In addition, the second lens housing 122a may include a fifth pin guide portion 122p5 fitted to the first guide pin 51.

In addition, the second housing 122 further includes a second-second yoke (not shown) under the second magnet 126 inside the second driving part housing 122b, so that it is possible to block the magnetic force of the second magnet 126 from affecting the inside of the base body 22 by the first-second yoke.

Hereinafter, the first lens assembly 110 will be described with reference to FIGS. 18B and 18C.

Figure 18B:
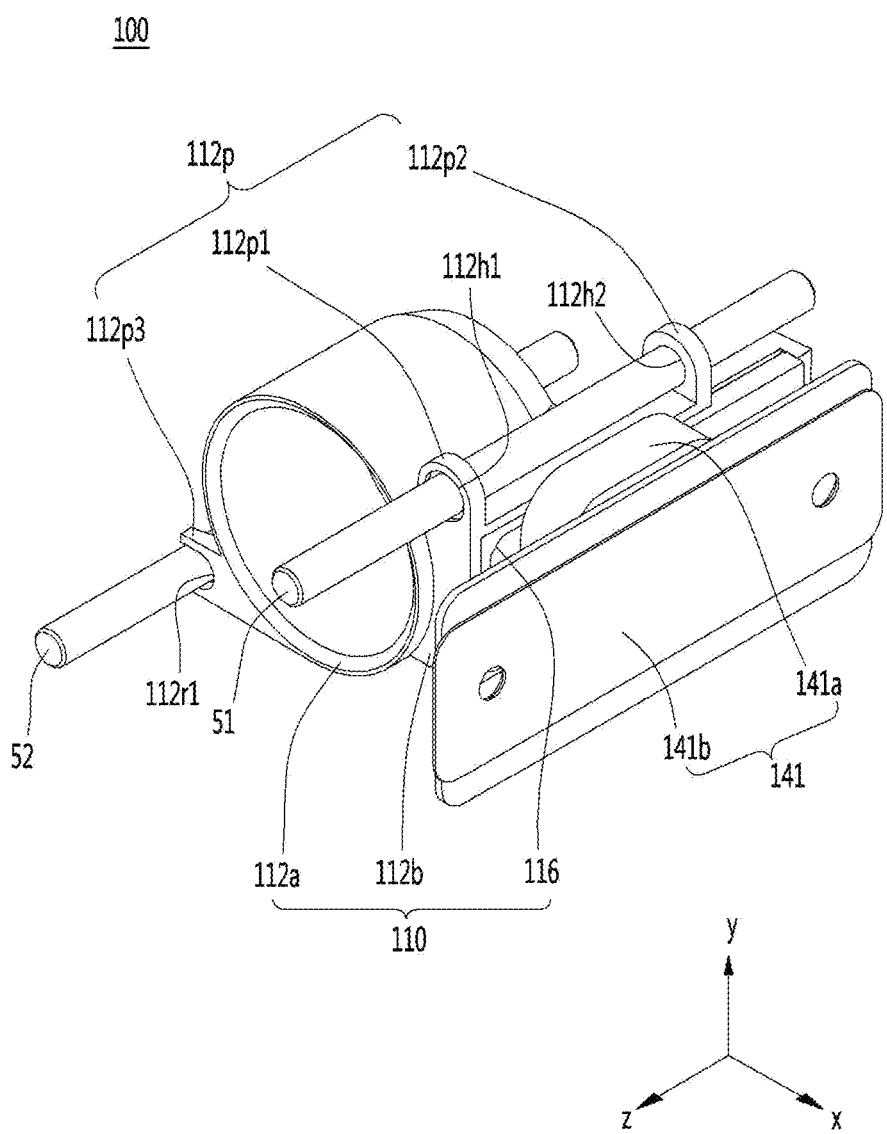
FIG. 18B is a perspective view of a first lens assembly and a first driving part in the first camera actuator in the embodiment shown in FIG. 17A.
Figure 18C:
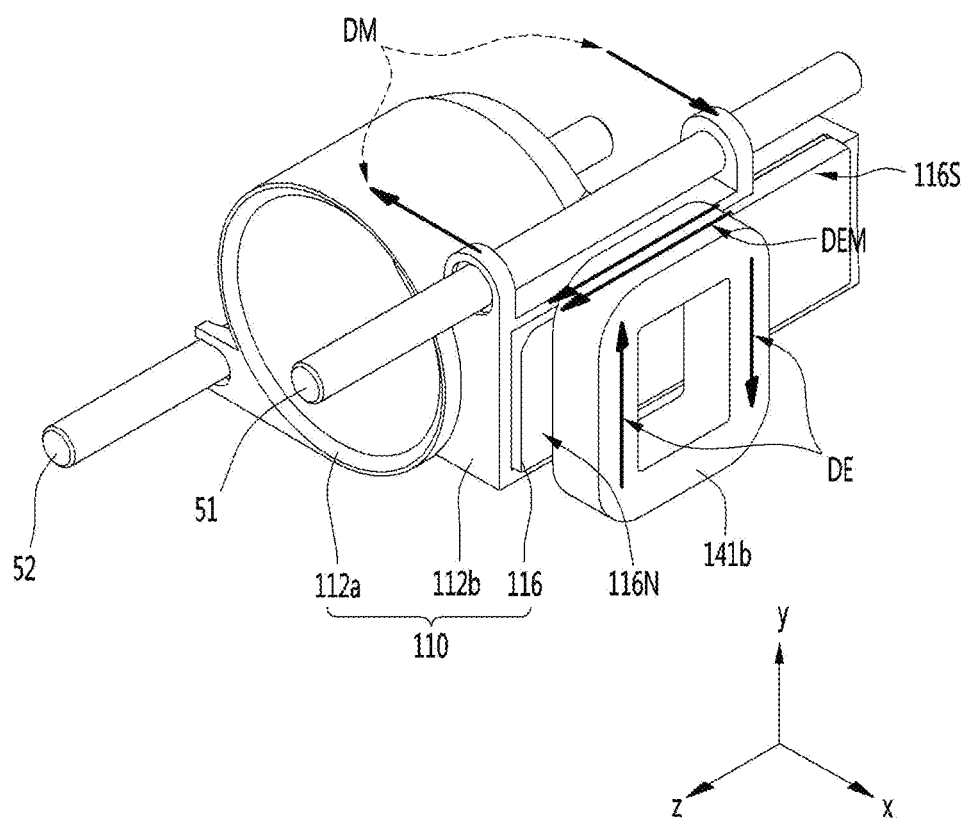
FIG. 18C is an exemplary diagram illustrating interaction between a first magnet and a first coil unit in the first camera actuator in the embodiment shown in FIG. 18B.

FIG. 18B is a perspective view of the first lens assembly 110 and the third driving part 141 in the first camera actuator 100 according to the embodiment shown in FIG. 18A, and FIG. 18C is a perspective example view of an interaction between the first magnet 116 and the first coil part 141b in the first camera actuator 100 according to the embodiment shown in FIG. 18B.

Referring to FIG. 18B, the first lens assembly 110 may include a first lens housing 112a and a first driving part housing 112b. The first lens housing 112a functions as a barrel or a case, and a first lens group (not shown) may be mounted. The first lens group (not shown) may be a moving lens group, and may include a single lens or a plurality of lenses. The second housing 122 of the second lens assembly 120 may also include a second lens housing 122a and a second driving part housing 122b.

Next, a first magnet 116 may be disposed on the first driving part housing 112b of the first lens assembly 110.

The first magnet 116 of the first lens assembly 110 may be a magnet driving part, but is not limited thereto. For example, the first magnet 116 may include a first magnet that is a permanent magnet. Also, the second driving part 126 of the second lens assembly 120 may be a magnet driving part, but is not limited thereto.

An interaction in which an electromagnetic force (DEM) generated between the first magnet 116 and the first coil unit 141b in the first camera actuator 100 according to the embodiment will be briefly described with reference to FIG. 18C.

FIG. 18C, in the first camera actuator 100 according to the embodiment, the magnetization method of the first magnet 116 may be a vertical magnetization method. For example, in the embodiment, both the N pole 116N and the S pole 116S of the first magnet 116 may be magnetized to face the first coil part 141b. Accordingly, the N-pole 116N and the S pole 116S of the first magnet 116 may be disposed to correspond to a region in which the current flows in the y-axis direction perpendicular to the ground in the first coil unit 141b.

Referring to FIG. 18C, in an embodiment, a magnetic force DM may be applied in a direction opposite to the x-axis at the N pole 116N of the first magnet 116. In addition, when the current DE flows in the y-axis direction in the region of the first coil unit 312 corresponding to the N-pole 116N, the electromagnetic force DEM acts in the z-axis direction according to Fleming's left-hand rule.

In addition, in the embodiment, a magnetic force DM may be applied in the x-axis direction from the S pole 116S of the first magnet 126. When the current DE flows in a direction opposite the y-axis perpendicular to the ground in the first coil part 312 corresponding to the S pole 116S, the electromagnetic force DEM acts in the z-axis direction according to Fleming's left-hand rule.

At this time, since the third driving part 141 including the first coil unit 141b is in a fixed state, the first lens assembly 110, which is a mover in which the first magnet 116 is disposed, has an electromagnetic force DEM according to the current direction. By this, it can be moved back and forth in a direction parallel to the direction of the z-axis. The electromagnetic force DEM may be controlled in proportion to the current DE applied to the first coil unit 141b.

Similarly, in the camera module according to the embodiment, electromagnetic force DEM can be generated between the second magnet 126 and the second coil unit 142b, so that the second lens assembly 120 may be moved horizontally with respect to the optical axis.

Referring back to FIG. 18B, in an embodiment, the first driving part housing 112b may guide the first lens assembly 110 in the optical axis direction by having at least one pin guide unit 112p. In an embodiment, the pin guide part 112p may include the first pin guide part 112p1 and the second pin guide part 112p2.

For example, the first driving part housing 112b may include a first pin guide part 112p1 protruding upward, and a first guide hole 112h1 may be disposed in the first pin guide part 112p1.

In addition, the first driving part housing 112b may further include a second pin guide part 112p2 protruding upward and spaced apart from the first pin guide part 112p1. A second guide hole 112h2 may be disposed in the second pin guide part 112p2.

According to the embodiment, the first guide pin 51 is inserted into the first and second guide holes 112h1 and 112h2 of the first pin guide part 112p1 and the second pin guide part 112p2, so that the first lens assembly 110 can be precisely guided parallel to the optical axis direction.

According to this, according to the embodiment, the first pin guide portion 112p1 and the second pin guide portion 112*p*2 of the first housing 112 contact the first guide pin 51 to minimize the contact area to each other such that the embodiment can inhibit a frictional resistance. Accordingly, according to the embodiment, there are technical effects such as improvement of driving force and reduction of power consumption by inhibiting occurrence of friction torque during zooming.

In addition, according to the embodiment, the friction torque can be reduced by reducing the weight of the first driving part housing 112*b*, thereby improving driving force during zooming, reducing power consumption, and improving control characteristics.

For example, according to the embodiment, a region other than the first pin guide part 112*p*1 and the second pin guide part 112*p*2 is removed from the upper region of the first driving part housing 112*b* where the first guide pin 51 is located. Accordingly, by reducing the weight of the first driving part housing 112*b*, frictional resistance can be reduced, thereby improving driving force during zooming, reducing power consumption, and improving control characteristics.

With continued reference to FIG. 18B, the first lens housing 112*a* includes at least one pin guide portion 112*p* protruding to the side, thereby guiding the movement of the first lens assembly 110 in the optical axis direction. It is possible to inhibit the central axis from being distorted by inhibiting the lens from tilting upward and downward.

For example, the first lens housing 112*a* may include a third pin guide part 112*p*3 protruding to the side, and a first guide groove 112*r*1 may be disposed in the third pin guide part 112*p*3.

According to the embodiment, the second guide pin 52 can be inserted into the first guide groove r1 of the third pin guide part 112*p*3, so that the first lens assembly 110 can be precisely guided parallel to the optical axis direction.

Accordingly, according to an exemplary embodiment, by supporting the second guide pin 52 in the third pin guide portion 112*p*3 of the first lens housing 112*a*, tilting of the lens portion upward and downward may be inhibiting, thereby inhibiting the central axis from being twisted.

In addition, according to the embodiment, the second guide pin 52 can be in contact with the third pin guide portion 112*p*3 of the first lens housing 112*a*, thereby minimizing the frictional area. Accordingly, there are technical effects such as improvement of driving force during zooming, reduction of power consumption, and improvement of control characteristics by inhibiting frictional resistance.

In addition, according to the embodiment, the second guide pin 52 can be in contact with the third pin guide portion 112*p*3 of the first lens housing 112*a*, thereby minimizing the frictional area. Accordingly, there are technical effects such as improvement of driving force during zooming, reduction of power consumption, and improvement of control characteristics by preventing frictional resistance.

In addition, according to the embodiment, the friction torque can be reduced by reducing the weight of the first lens housing 112*a*, thereby improving driving force during zooming, reducing power consumption, and improving control characteristics.

For example, according to the embodiment, the second guide pin 52 is located on the third pin guide part 112*p*3, and the area excluding the third pin guide part 112*p*3 from the side area of the first lens housing 112*a* can be removed. Accordingly, by reducing the weight of the first lens housing 112*a*, friction torque is reduced, thereby improving driving force during zooming, reducing power consumption, and improving control characteristics.

According to the embodiment, there is a technical effect of providing an ultra-slim, ultra-micro camera actuator and a camera module including the same.

In addition, according to the embodiment, there is a technical effect of providing a camera actuator, and a camera module including the same, capable of securing a sufficient amount of light by removing a size limitation of a lens in a lens assembly of an optical system when implementing OIS.

In addition, according to the embodiment, there is a technical effect of inhibiting an optical axis tilt issue in which the optical axis of the prism is twisted during assembly or use of a prism.

In addition, according to the embodiment, there is a technical effect of providing a camera actuator and a camera module, capable of exhibiting the best optical characteristics by minimizing the occurrence of a decent or a tilt phenomenon when implementing OIS.

In addition, according to the embodiment, when implementing OIS, there is a technical effect of providing a camera actuator and a camera module, capable of inhibiting magnetic field interference with a magnet for AF or zoom.

In addition, according to the embodiment, there is a technical effect of providing a camera actuator and a camera module, capable of implementing OIS with low power consumption.

In addition, according to the embodiment, the prism unit 230 and the lens unit 222*c* including the variable prism may be arranged very close. Accordingly, even if the optical path change is finely performed in the lens unit 222*c*, there is a special technical effect of ensuring a wide range of optical path changes in the actual image sensor unit.

In addition, according to the embodiment, the first protrusion 222*b*1 and the second protrusion 222*b*2 of the shaper unit 222 may be spaced apart, and the third protrusion 222*b*3 and the fourth protrusion 222*b*4 may be spaced apart from each other. Accordingly, when moving the x-axis or y-axis of each protrusion part, the other protrusions may be less affected, so that the amount of error change generated compared to the target value (ideal) when driving in each axial direction is significantly reduced, thereby improving performance.

Figure 19:
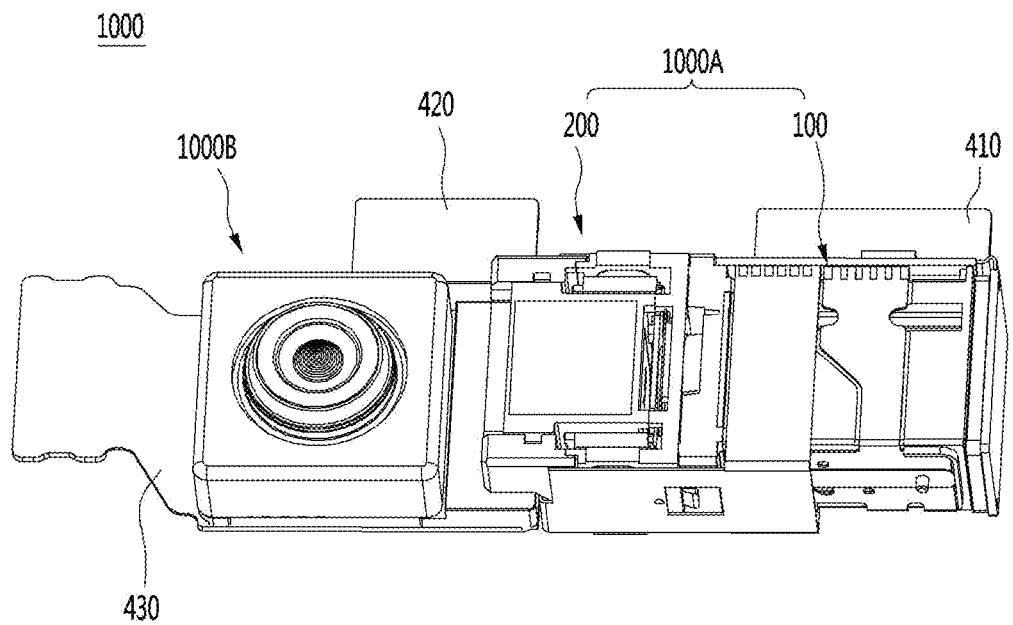
FIG. 19 is a perspective view of a camera module according to another embodiment.

Next, FIG. 19 is another perspective view of the camera module 1000 according to another embodiment.

The camera module 1000 according to another embodiment may further include a second camera module 1000B in addition to the camera module 1000A described above. The second camera module 1000B may be a camera module having a fixed focal length lens. The fixed focal length lenses may be referred to as "single focal length lenses" or "single lens". The second camera module 1000B may be electrically connected to the circuit board 430 of the third group. The second camera actuator 200 included in the camera module 1000A may be electrically connected to the second group of circuit boards 420.

INDUSTRIAL AVAILABILITY

Figure 20:
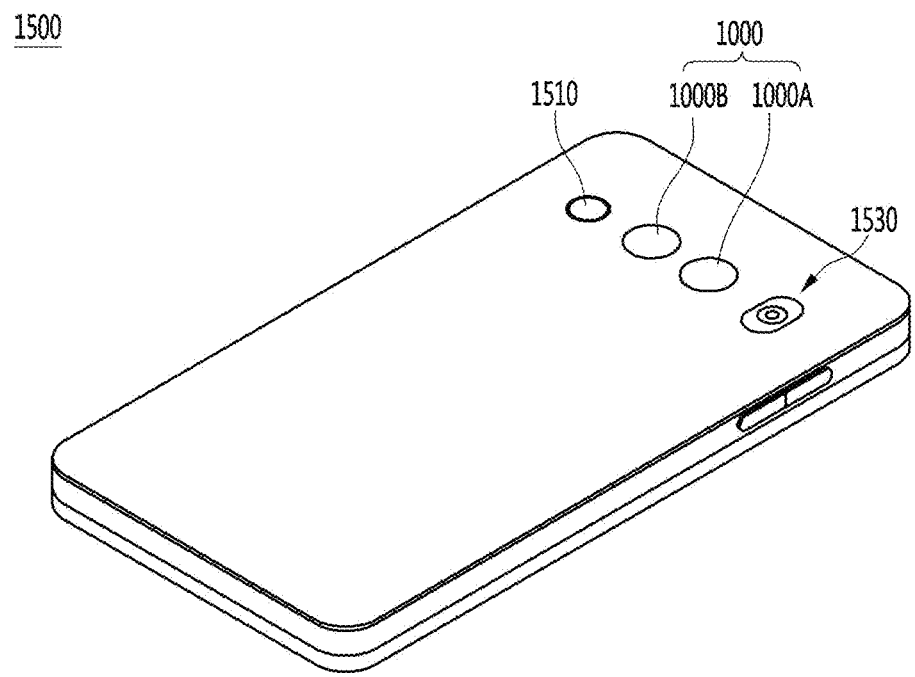
FIG. 20 is a perspective view of a mobile terminal to which a camera module according to an embodiment is applied.

FIG. 20 is a mobile terminal 1500 to which a camera module according to an embodiment is applied.

As shown in FIG. 20, the mobile terminal 1500 according to the embodiment may include a camera module 1000, a flash module 1530, and an autofocus device 1510 provided on the rear side.

The camera module 1000 may include an image capturing function and an auto focus function. For example, the camera module 1000 may include an auto focus function using an image.

The camera module 1000 processes image frames of still images or moving pictures obtained by an image sensor in a photographing mode or a video call mode. The processed image frame may be displayed on a predetermined display unit and stored in a memory. A camera (not shown) may also be disposed in front of the mobile terminal body.

For example, the camera module 1000 may include a first camera module 1000A and a second camera module 1000B, and OIS is implemented with an AF or zoom function by the first camera module 1000A.

The flash module 1530 may include a light emitting device that emits light therein. The flash module 1530 may be operated by a camera operation of a mobile terminal or a user's control.

The autofocus device 1510 may include one of packages of a surface light emitting laser device as a light emitting unit.

The auto focus device 1510 may include an auto focus function using a laser. The autofocus device 1510 may be mainly used in a condition in which an autofocus function using an image of the camera module 1000 is deteriorated, for example, in a proximity or dark environment of 10 m or less. The autofocusing device 1510 may include a light emitting unit including a vertical cavity surface emission laser (VCSEL) semiconductor device, and a light receiving unit that converts light energy such as a photodiode into electrical energy.

Features, structures, effects, and the like described in the above embodiments are included in at least one embodiment, and are not necessarily limited to only one embodiment. Furthermore, the features, structures, effects, and the like illustrated in each embodiment may be combined or modified for other embodiments by a person having ordinary knowledge in the field to which the embodiments belong. Therefore, contents related to such combinations and modifications should be interpreted as being included in the scope of the embodiments.

Although the embodiments have been described above, these are only examples and are not intended to limit the embodiments, and those of ordinary skill in the field to which the embodiments belong to various types not illustrated above without departing from the essential characteristics of this embodiment. It will be seen that branch transformation and application are possible. For example, each component specifically shown in the embodiment can be modified and implemented. And differences related to these modifications and applications should be construed as being included in the scope of the embodiments set in the appended claims.

The invention claimed is:

1. A camera actuator, comprising:
a lens unit;
a shaper unit disposed on the lens unit, comprising a shaper body including a first side surface and a second side surface opposite from the first side surface, a first protruding region protruding from the first side surface of the shaper body, and a second protruding region protruding from the second side surface of the shaper body;
a first driving part coupled to the shaper unit;
a second driving part disposed to correspond to the first driving part,
wherein the first protruding region includes a first protrusion protruding from one portion of the first side surface and a second protrusion protruding from an other portion of the first side surface and spaced apart from the first protrusion,
wherein the second protrusion region includes a third protrusion protruding from one portion of the second side surface and a fourth protrusion protruding from an other portion of the second side surface and spaced apart from the third protrusion, and
wherein the first driving part includes first to fourth unit driving parts coupled to the first to fourth protrusions, respectively, and
wherein the second driving part includes fifth to eighth unit driving parts respectively corresponding to the first to fourth unit driving parts.

2. The camera actuator of claim 1, wherein each of the first to fourth unit driving parts includes first to fourth magnets, and each of the fifth to eighth unit driving parts includes first to fourth coils, and the first and second unit driving parts include first and second magnet frames on which the first and second magnets are respectively disposed.

3. The camera actuator of claim 2, wherein the first magnet frame and the second magnet frame are integrally formed.

4. The camera actuator of claim 2, wherein the first unit driving part includes a first yoke coupled with the first protrusion, and the first magnet frame has a frame groove in which the first yoke is disposed.

5. The camera actuator of claim 1, comprising a housing in which the second driving part is disposed,
wherein the housing includes a housing body in which the lens unit is disposed, a first housing side part disposed in a direction in which the first protruding region protrudes, and a second housing side part disposed in a direction in which the second protruding region protrudes.

6. The camera actuator of claim 1, comprising a housing in which the second driving part is disposed,
wherein the housing includes first to fourth jig holes formed to overlap the first to fourth protrusions in a vertical direction.

7. A camera module, comprising:
a lens assembly;
an image sensor unit disposed on one side of the lens assembly; and
a camera actuator of claim 1 disposed on an other side of the lens assembly.

8. The camera actuator of claim 5, wherein each of the first housing side part and the second housing side part includes a driving part hole in which the second driving part is disposed.

9. The camera actuator of claim 6, wherein the housing includes an opening formed between the first to fourth jig holes.

10. A camera actuator, comprising:
a housing;
an image shaking control unit;
a shaper unit disposed on the housing and including a first driving part; and
a second driving part disposed on the housing,
wherein the shaper unit includes a shaper body, a first protrusion extending laterally from the shaper body in a first lateral direction and coupled to the first driving part, a second protrusion extending laterally from the shaper body in the first lateral direction, a third protrusion extending laterally from the shaper body in a second lateral direction opposite from the first lateral direction, and a lens unit disposed on the shaper body,
wherein the shaper body of the shaper unit includes a first side surface and a second side surface opposite from the first side surface, a first protruding region protruding from the first side surface of the shaper body, and a second protruding region protruding from the second side surface of the shaper body, wherein the first protruding region includes the first protrusion protruding from one portion of the first side surface and the second protrusion protruding from an other portion of the first side surface and spaced apart from the first protrusion, and wherein the shaper unit comprises a fourth protrusion extending laterally from the shaper body in the second lateral direction.

11. The camera actuator of claim 10, comprising a prism unit disposed on the image shaking control unit, wherein the lens unit includes a variable prism or a liquid lens, wherein the first driving part includes a magnet coupled to the first protrusion, and wherein the second driving part includes a coil coupled to the shaper body.

12. The camera actuator of claim 11, wherein a first support part, which is an end of the first protrusion, and a second support part, which is an end of the second protrusion, are spaced apart from each other.

13. The camera actuator of claim 10, wherein the housing includes a housing body in which the lens unit is disposed, a first housing side part disposed in the first lateral direction, and a second housing side part disposed in the second lateral direction.

14. The camera actuator of claim 13, wherein each of the first housing side part and the second housing side part includes a driving part hole in which the second driving part is disposed.

15. The camera actuator of claim 12, wherein the housing includes a jig hole formed to overlap the first protrusion and the second protrusion in a vertical direction.

16. The camera actuator of claim 15, wherein the housing includes an opening formed between the jig holes.

17. A camera module, comprising:

a lens assembly;

an image sensor unit disposed on one side of the lens assembly; and a camera actuator of claim 10 disposed on an other side of the lens assembly.

18. A camera actuator, comprising:

a housing;

an image shaking control unit;

a shaper unit disposed on the housing and including a first driving part; and a second driving part disposed on the housing, wherein the shaper unit includes a shaper body, a protrusion extending laterally from the shaper body and coupled to the first driving part, and a lens unit disposed on the shaper body, wherein the shaper body of the shaper unit includes a first side surface and a second side surface opposite from the first side surface, a first protruding region protruding from the first side surface of the shaper body, and a second protruding region protruding from the second side surface of the shaper body, wherein the protrusion comprises a first protrusion and a second protrusion, wherein the first protruding region includes the first protrusion protruding from one portion of the first side surface and the second protrusion protruding from an other portion of the first side surface and spaced apart from the first protrusion, and wherein the second protrusion region includes a third protrusion protruding from one portion of the second side surface and a fourth protrusion protruding from an other portion of the second side surface and spaced apart from the third protrusion.

* * * * *